(12) United States Patent
Ding et al.

(10) Patent No.: US 8,000,932 B2
(45) Date of Patent: Aug. 16, 2011

(54) SYSTEM AND METHOD FOR STATISTICAL PERFORMANCE MONITORING

(75) Inventors: Yiping Ding, Dover, MA (US); Kenneth W. Newman, Cambridge, MA (US)

(73) Assignee: BMC Software, Inc., Houston, TX (US)

( * ) Notice: Subject to any disclaimer, the term of this patent is extended or adjusted under 35 U.S.C. 154(b) by 846 days.

(21) Appl. No.: 11/277,307

(22) Filed: Mar. 23, 2006

(65) Prior Publication Data

US 2006/0161648 A1   Jul. 20, 2006

Related U.S. Application Data

(63) Continuation of application No. 10/684,132, filed on Oct. 10, 2003, now Pat. No. 7,076,397.

(60) Provisional application No. 60/419,175, filed on Oct. 17, 2002.

(51) Int. Cl.
   *G06F 11/30* (2006.01)
(52) U.S. Cl. ........................................................ 702/182
(58) Field of Classification Search .................... 702/182
   See application file for complete search history.

(56) References Cited

U.S. PATENT DOCUMENTS

| | | | |
|---|---|---|---|
| 6,564,174 B1 | 5/2003 | Ding et al. | |
| 6,643,614 B2 | 11/2003 | Ding et al. | |
| 6,691,067 B1 | 2/2004 | Ding | |
| 6,735,553 B1 | 5/2004 | Frogner et al. | |
| 7,023,921 B2 * | 4/2006 | Subramaniyan et al. | 375/240.16 |
| 7,043,970 B2 * | 5/2006 | Ristea et al. | 73/73 |
| 2003/0110007 A1 * | 6/2003 | McGee et al. | 702/179 |
| 2003/0126256 A1 * | 7/2003 | Cruickshank et al. | 709/224 |
| 2004/0133395 A1 | 7/2004 | Ding et al. | |

OTHER PUBLICATIONS

Yiping Ding and Kenneth Newman, "Automatic Workload Characterization," CMG2000 Proceedings, vol. 1 (2000), 153-66.
Yiping Ding, Kenneth Newman, and Chris Thornley, "On Correlating Performance Metrics," CMG2001 Proceedings, vol. 1 (2001), 467-77.
Regina Kwon, "SLAs: A Penalty Now Saves Suffering Later," obtained from http://www.baselinemag.com/print_article/0,3668,a+24380,00.asp, dated Mar. 18, 2002, 2-pages.
Chris Overton, "Service Level Agreements (SLA's) Between Content Distributors and Content Creators," Keynote Presentation at CMG01 [No written material available].

* cited by examiner

*Primary Examiner* — Aditya Bhat

(57) ABSTRACT

A method using statistical parameters (e.g. mean, standard deviation, exceptional values) of performance monitoring metrics to substantially reduce the quantity of performance monitoring data collected and reported, make system performance monitoring scalable and enhance the readability of the system performance display. The number of metrics monitored may be reduced by monitoring only one of any two metrics that are closely correlated.

26 Claims, 19 Drawing Sheets

US 8,000,932 B2

SYSTEM AND METHOD FOR STATISTICAL PERFORMANCE MONITORING

RELATED APPLICATIONS

This application is a continuation of co-pending U.S. patent application Ser. No. 10/684,132, filed Oct. 10, 2003, which is incorporated herein by reference, to which priority is claimed, and which claims priority to U.S. Provisional Application Ser. No. 60/419,175, filed on Oct. 17, 2002.

This application is related to an application by the same inventors, entitled: "Enterprise Management System and Method which Includes Statistical Recreation of System Resource Usage for More Accurate Monitoring, Predication and Performance Workload Characterization," Ser. No. 09/287,601, filed on Apr. 7, 1999.

Both of the above applications are incorporated herein by reference.

BACKGROUND OF THE INVENTION

1. Field of the Invention

This invention relates generally to system performance monitoring, especially for performance monitoring of a distributed computer network system with a massive number of nodes or consoles.

2. Description of the Related Art

The data processing resources of business organizations are increasingly taking the form of a distributed computing environment in which data and processing are disbursed over a network comprising many interconnected, heterogeneous, geographically remote computers. Such a computing environment is commonly referred to as an enterprise computing environment, or simply an enterprise. Managers of the enterprise often employ software packages known as enterprise management systems to monitor, analyze, and manage the resources of the enterprise. Enterprise management systems may provide for the collection of measurements, or metrics, concerning the resources of individual systems. For example, an enterprise management system might include a software agent on the individual computer system for the monitoring of particular resources such as CPU usage or disk access. U.S. Pat. No. 5,655,081 discloses one example of an enterprise management system.

In a sophisticated enterprise management system, tools for analysis, modeling, planning, and prediction of system resources utilization are useful for assuring the satisfactory performance of one or more computer systems in the enterprise. Examples of such analysis and modeling tools are the "ANALYZE" and "PREDICT" components of "PATROL Perform/Predict for UNIX or Windows" or "BEST/1 for Distributed Systems" available from BMC Software, Inc. Such tools usually require the input of periodic measurements of the usage of resources such as CPUs, memories, hard disks, network bandwidth, number of files transferred, number of visitors to a particular web page, and the like. To insure accurate analysis and modeling, therefore, the collection of accurate performance data is critical.

Many modern operating systems, including "Windows NT" and UNIX, are capable of producing an enormous amount of performance data and other data concerning the state of the hardware and software of the computer system. Such data collection is a key step for any system performance analysis and prediction. The operating system or system software collects raw performance data, usually at a high frequency, stores the data in a registry of metrics, and then periodically updates the data. In most case, metric data is not used directly, but instead sampled from the registry. Sampling at a high frequency can consume substantial system resources such as CPU cycles, storage space, and I/O bandwidth. Therefore, it is impractical to sample the data at a high frequency. On the other hand, infrequent sampling cannot capture the complete system state: for example, significant short-lived events and/or processes can be missed altogether. Infrequent sampling may therefore distort a model of a systems performance. The degree to which the sampled data reliably reflects the raw data determines the usefulness of the performance model for system capacity planning. The degree of reliability also determines the usefulness of the performance statistics presented to system managers by performance tools.

Sensitivity to sampling frequency varies among data types. Performance data can be classified into three categories: cumulative, transient, and constant. Cumulative data is data that accumulates over time. For example, a system CPU time counter may collect the total number of seconds that a processor has spent in system state since system boot. With transient data, old data is replaced by new data. For example the amount of free memory is a transient metric which is updated periodically to reflect the amount of memory not in use. For transient metrics the only way to find even approximate means, variances, or standard deviations is to do periodic sampling. The third type of performance data, constant data, does not change over the measurement interval or lifetime of the event. For example, system configuration information, process ID, CPU model type, and process start time are generally constant values.

Of the three data types, transient performance metrics are the most sensitive to variations in the sampling interval and are therefore, the most likely to be characterized by uncertainty. For example, with infrequent sampling, some state changes may be missed completely. However, cumulative data may also be rendered uncertain by infrequent sampling, especially with regards to the calculation of the variation of such a metrics. Clearly then, uncertainty of data caused by infrequent sampling can cause serious problems in performance modeling. A related patent application titled "Enterprise Management System and Method Which Include Statistical Recreation of System Resource Usage for More Accurate Monitoring, Prediction and Performance Workload Characterization," Ser. No. 09/287,601, discloses a system and method that meets the needs for more accurate and efficient monitoring and prediction of computer system performance.

Even when sampling frequencies are reduced, the performance data collected by system monitors can still be enormous. Traditional performance monitoring methods and/or tools display performance metric values at a rate similar to the rate they are sampled. To accurately monitor the hardware and software of a computer system, many different metrics are sampled, collected, stored and/or reported. When a computer network system or enterprise comprises only a few nodes, the aggregation of the monitoring data from each of the few nodes may not be a problem. But when the system grows, the performance data collected from each computer or node will increase proportionally. The large quantity of data that has to be pushed or pulled across a network for displaying or reporting becomes impractical or even impossible when hundreds or even thousands of nodes are managed from a few nodes or consoles. Therefore, it is desirable to have a method or system to further reduce the growth of data quantity in order to maintain the ability to monitor the performance of each node.

SUMMARY OF THE INVENTION

The present invention uses statistical parameters, such as mean, standard deviation, and exceptional value to reduce the amount of system performance data collected and transmitted to a system performance monitor for system performance monitoring and analysis. In one embodiment, to reduce the amount of data collected for analysis, appropriate metrics are selected for different system performance monitoring; appropriate thresholds or ranges for the metrics are set; the data collection frequencies may also be varied depending on the metrics used. Sampled data for a particular performance metric within a range are not reported, but are replaced with the average of the metric. Only the data that are outside the range or threshold are reported for analysis and/or visualization.

In another embodiment, the average of the metric is updated constantly by the Collector. When at the end of a measurement period the updated average differs from the original average (that was being used by the system performance monitor) by an amount that exceeds a threshold, then the new average replaces the old average. The new average is stored and reported to the system performance monitor.

In a third embodiment, various metrics are compared and their inter-dependences are determined. If the correlation between two metrics is within a certain range or threshold, then only the first metric is collected, transmitted and reported for both metrics. Thus the number of metrics needed to be monitored is decreased without losing any important information.

BRIEF DESCRIPTION OF THE DRAWINGS

A better understanding of the invention can be obtained when the following detailed description of the preferred embodiment is considered in conjunction with the following drawings, in which.

DESCRIPTION OF THE PREFERRED EMBODIMENT

Figure 1:
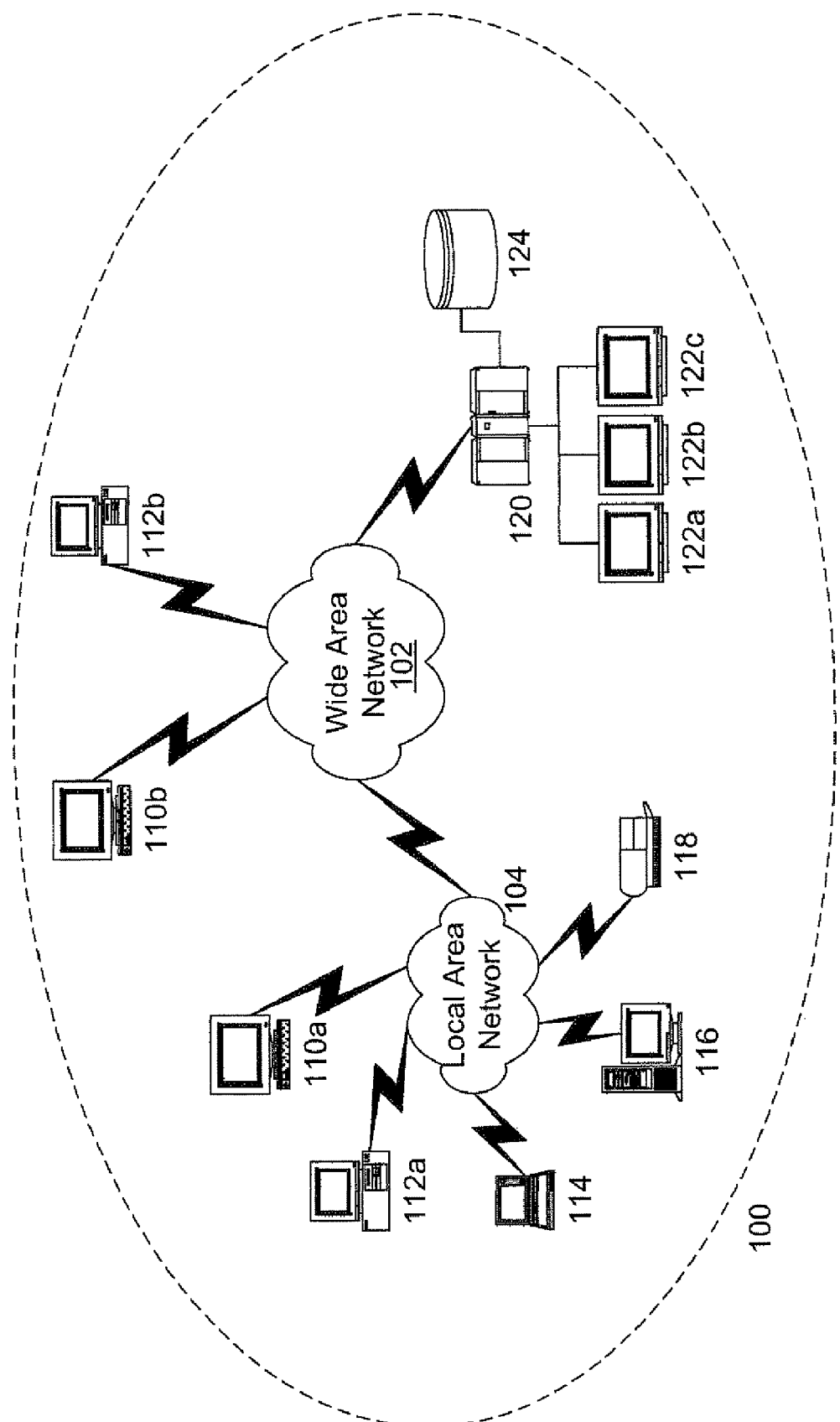
FIG. 1 is a network diagram of an illustrative enterprise computing environment.

FIG. 1 illustrates an enterprise computing environment. The enterprise 100 comprises a plurality of computer systems which are interconnected through one or more networks. One or more local area network (LANs) 104 may be included in the enterprise 100. A LAN 104 is a network that spans a relatively small area. Typically, a LAN 104 is confined to a single building or group of buildings. Each node (i.e., an individual computer system or device) on a LAN 104 preferably has its own CPU with which it executes programs, and each node is also able to access data and devices anywhere on the LAN 104. The LAN 104 thus allows many users to share devices as well as data stored on file servers. The LAN 104 may be characterized by any of a variety types of topology (i.e., the geometric arrangement of devices on the network), of protocols (i.e., the rules and coding specifications for sending data, and whether the network uses a peer to-peer or client/server architecture), and of media (e.g., twisted pair wire, coaxial cables, fiber optic cables, radio waves). As illustrated in FIG. 1, the enterprise 100 includes one LAN 104. However, the enterprise 100 may include a plurality of LANs 104 which are coupled to one another through a wide area network (WAN) 102. A WAN is a network that spans large geographic areas.

Each LAN 104 comprises a plurality of interconnected computer systems and optionally one or more other devices: for example, one or more work stations 110a, one or more personal computers 112a, one or more laptop or notebook computer systems 114, one or more server computer systems 116, and one or more network printers 118. As illustrated in FIG. 1, the LAN 104 comprises one of each computer systems 110a, 112a, 114, and 116, and one printer 118. The LAN 104 may be coupled to other computer systems and/or devices and/or LANs 104 through a WAN 102.

One or more mainframe computer systems 120 may optionally be coupled to the enterprise 100. As shown in FIG. 1, the mainframe 120 is coupled to the enterprise 100 through the WAN 102, but alternatively one or more mainframe 120 may be coupled to the enterprise 100 through one or more LANs 104. As shown, the mainframe 120 is coupled to a storage device or file server 124 and the mainframe terminals 122a, 122b, and 122c. The mainframe terminals 122a, 122b, and 122c access data stored in the storage device or file server 124 coupled to or comprised in the mainframe computer system 120. The storage device can also couple to LAN, WAN, Internet and/or computer systems of different platforms.

The enterprise 100 may also comprise one or more computer systems which are connected to the enterprise 100 through the WAN 102: as illustrated, a workstation 110b and a personal computer 112b. In other words, the enterprise 100 may include one or more computer systems which are not coupled to the enterprise 100 through LAN 104. For example, the enterprise 100 may include computer system which are geographically remote and connected to the enterprise 100 through the internet.

Figure 2:
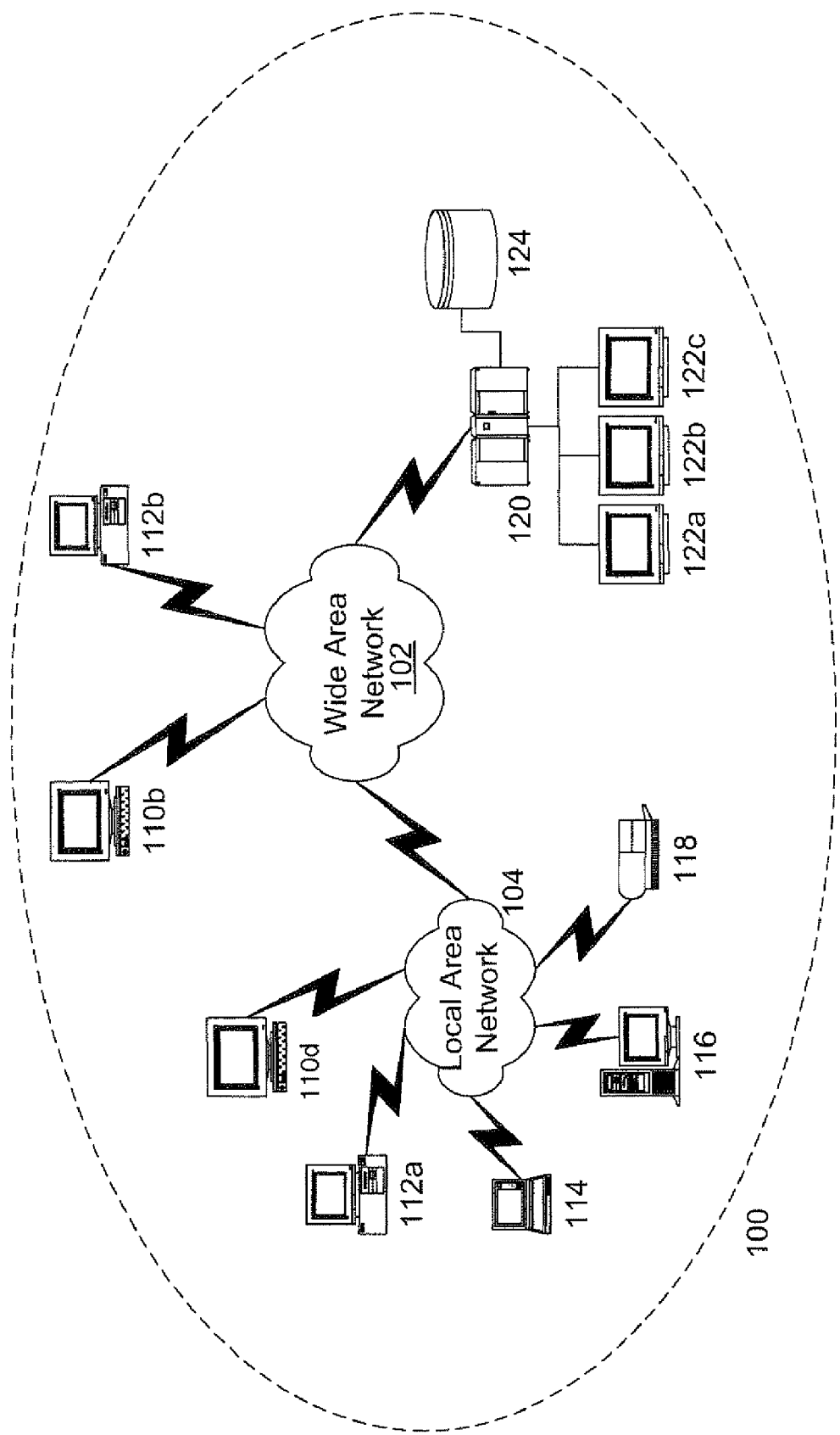
FIG. 2 is a network diagram of the illustrative enterprise computing environment, where one computer is collecting and monitoring the performance of all other connected computers.

To manage or monitor the performance of the network enterprise network system 100, some of the computers in the network for example, 110d as shown in FIG. 2 may act as a monitor or management console. The management monitor 120d will request and receive various performance measurement data from all the computers within the network system. With the various different performance data or metrics collected from the various computers connected to the network system 100, the monitor 110d can perform analysis on the performance of those various computer connected to the enterprise 100. When the enterprise system 100 has only a few nodes or even a few dozen nodes, the data collection for the performance analysis will not burden the network excessively. But when the number of nodes increases into hundreds or even thousands, the amount of data related to the system performance measurement collected at each node, forwarded to the monitor 110d may become prohibitively large. One of the benefits of the current invention is to reduce substantially the amount of data transferred from each node to the monitoring node.

Figure 3:
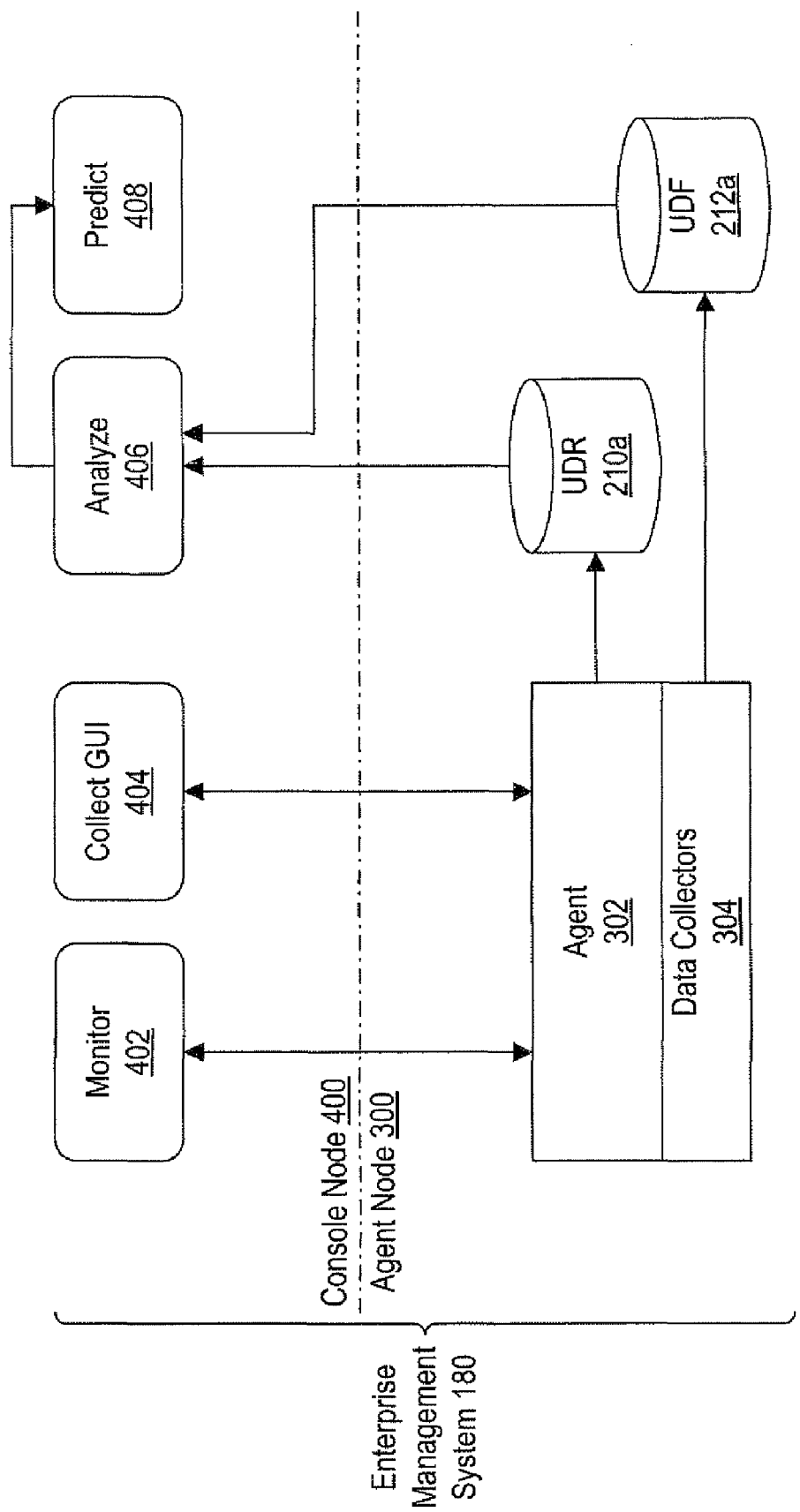
FIG. 3 is a block diagram illustrating an overview of the enterprise management system with a console node and agent node.

FIG. 3 shows an overview of the enterprise management system 180. The enterprise management system 180 includes at least one console node 400 (such as monitor 110*d* discussed above) and at least one agent node 300, but it may include a plurality of console nodes 400 and/or a plurality of agent nodes 300. In general, an agent node 300 executes software to sample/collect metric data on its computer system 150, and a console node 400 executes software to monitor, analyze, and manage the collected metrics from one or more agent nodes 300. A metric is as measurement of a particular system resource. For example, the enterprise management system 180 collects metrics such as CPUs, disk I/O, file system usage, database usage, thread, processes, kernel, registry, logic volumes, paging, number of visitors to a web page, pages viewed, types of web browsers. Each computer system 180 in the enterprise 100 may comprise a console node 400, an agent node 300, or both a console node 400 and an agent node 300.

The console node 400 may comprise four user visible components: a monitor component 402, a collect graphical user interface (GUI) 404, and Analyze component 406, and a Predict component 408. Both Analyze and Predict components have their GUI as well. All four components 402, 404, 406, and 408 of the console node 400 may be part of the "Perform/Predict for UNIX or Windows or "BEST/1 for Distributed Systems." software package or for the "PATROL" software package, or available from BMC Software, Inc. The agent node 300 may comprise an agent 302, one or more data collectors 304, universal data repository (URD) history files 210*a*, and universal data format (UDF) history files 212*a*. The agent node 300 may include either of UDR 210*a* or UDF 212*a*, but not both. The monitor component 402 allows a user to monitor, in real time, data that is being collected by an agent 302 and being sent to the monitor 402. The collect GUI 404 is employed to schedule data collection on an agent node 302. The analyze component 406 takes historical data from a UDR to 102A and/or UDF 212 to create a model of the enterprise 100. The predict component 408 takes the model from the analyze component 406 and allows a user to alter the model by specifying hypothetical changes to the enterprise 100. Analyze 406 and Predict 408 can create output in a format which can be understood and displayed by a Visualizer 204.

Agent 302 controls data collection in a particular computer system and reports the data in real time to one or more monitors 402. The data collectors 304 collect data from various processes and subsystems of the agent node 300. The agent 302 sends real time data to UDR 210A, which is a database of historical data in a particular data format. The UDF 212*a* is similar to that UDR 210*a*, but the UDF 212*a* uses an alternative data format and is written directly by the data collector 304.

Figure 4:
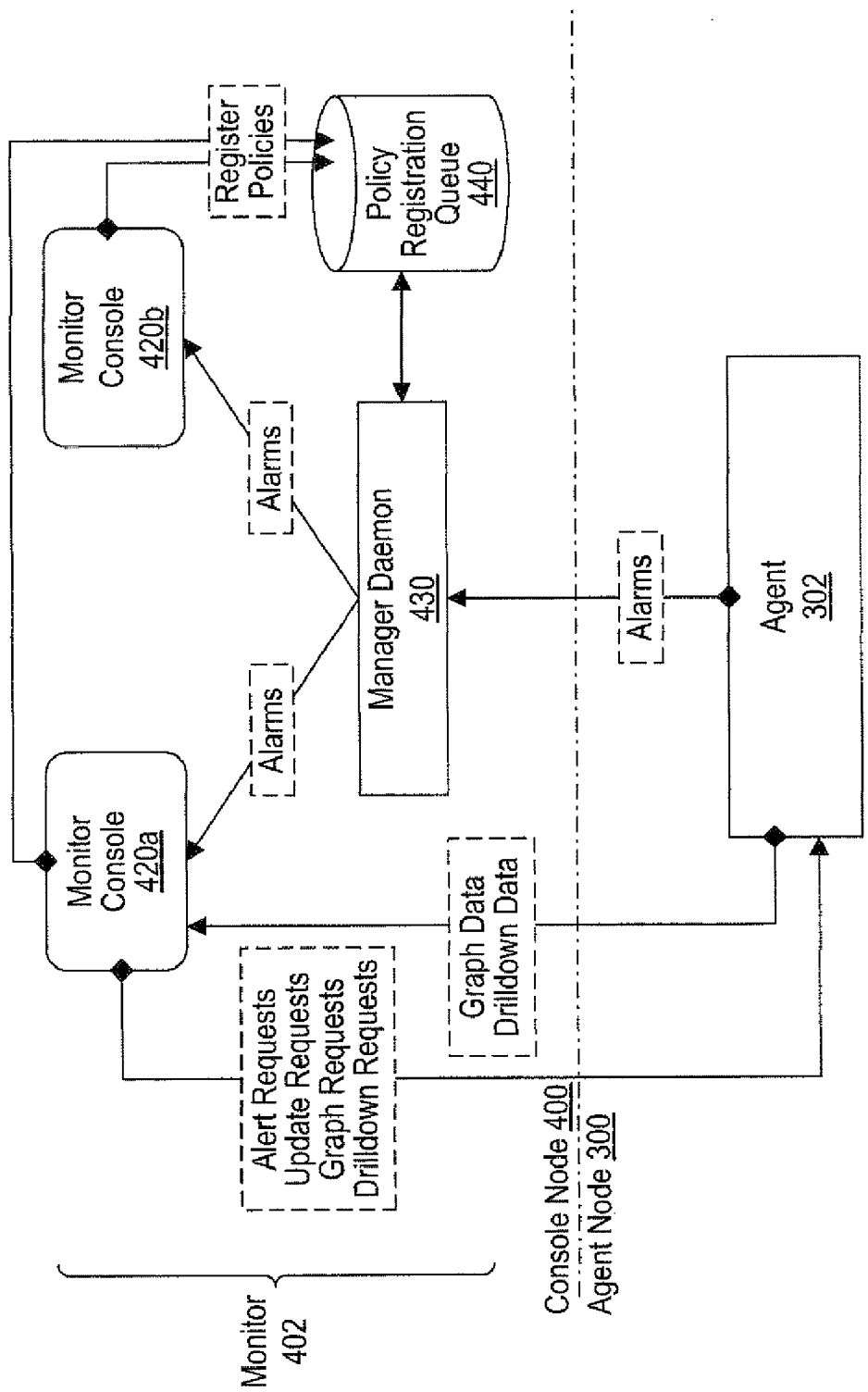
FIG. 4 is block diagram illustrating an overview of the monitor component of the enterprise management system.

FIG. 4 shows an overview of the monitor component 402 of the console node 400 of the enterprise management system 180. The monitor 402 comprises a manager daemon 430, one or more monitor consoles (as illustrated, 420*a* and 402*b*), and a policy registration queue 440. Although two monitor consoles 420*a* and 420*b* are shown in FIG. 4, there may be one or more consoles executing on any of one or more console nodes 400.

Figure 5:
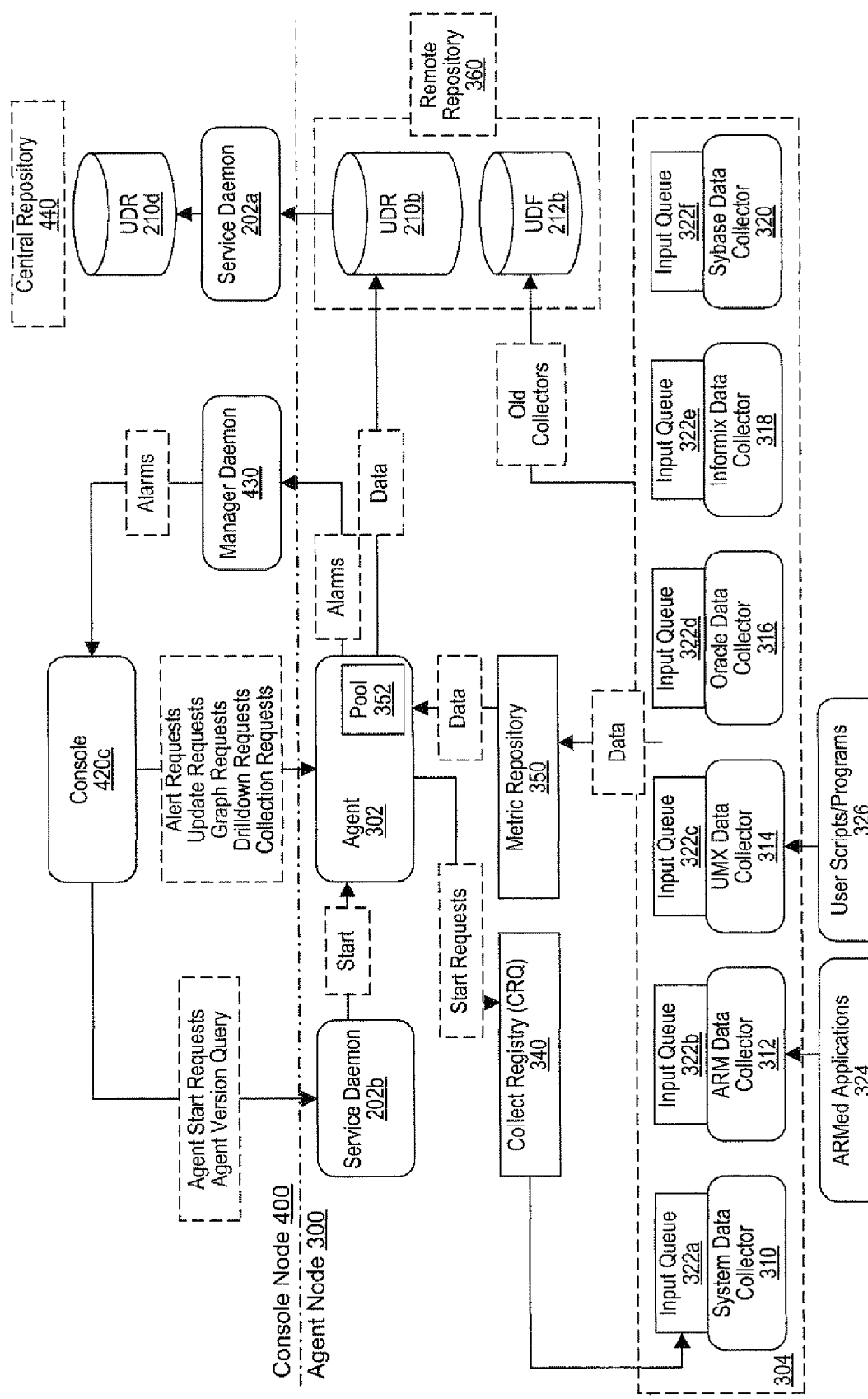
FIG. 5 is block diagram illustrating an overview of the agent component of the enterprise management system.

FIG. 5 shows a typical agent component 302 of the agent node 300 of the enterprise management system 180. Every agent node 300 has one agent 302. The monitor console 420*c* is another instance of the monitor consoles illustrated in FIG. 5 with reference number 420*a* and 420*b*.

When a user desires to start an agent 302 and begin collecting data on a particular agent node 300, the user operates the monitor console 420*c* to issue an agent star request through a service daemon 202*b*. The service daemon 202*b* is always executing on the agent node 300 in order to intercept messages from one or more monitor consoles 420 even when the agent 302 is offline. The service daemon 202*b* also intercepts agent version queries from the monitor console 420*c*. The monitor console 420*c* may also send a collection request, which requests the agents 302 to begin collecting particular metrics or metrics groups on the agent node 300.

When the agent 302 receives a collect request from the monitor console 420*c* through the service daemon 202*b*, the agent 302 initiates the collection through the collect registry queue (CRQ) 340. The agent 302 uses the CRQ 340 to control and schedule data collection. By helping the agent 302 know how many collectors 304 are running and whether the collector 304 are each the right type, the collect registry queue 340 prevents redundant collection. After metrics data is collected, the data is transferred to a metrics repository 350. The metrics repository 350 sits between the agent 302 and the collectors 304 and provides fast communication between the agent process 302 and the collector processes 304.

According to one embodiment of the current invention, rather than reporting all the collected metrics data from the agent 302 to the monitor console 420 as in some prior art methods, the metrics data are processed by the agent 302 and to reduce the amount of data that needs to be reported. One method according to the current invention to reduce the amount of data collected and stored and transferred between agent 302 and monitor console 420 is to use statistical performance monitoring. The focus of this method is on combining statistics of metrics for a larger interval, rather than retaining metrics at sample interval level. Performance metric values are often sampled every few seconds. This generates huge amounts of data when a system is monitored continuously with many metrics. For instance, at a five second sampling interval, 17,280 data points will be collected in just twenty-four hours and that is for only one metric. Systems may have over 100 metrics which means that the thousands of nodes will generate billions of data points each day. This is too much, especially since most of the data may not be interesting.

According to the methods of some embodiments of the current invention, the uninteresting data or data with redundant information are filtered out. The data is not needed if it is within a "boring" range. A value can be defined to be "boring" in many different ways. For instance, 1) if the difference of the sampled value and the average is within the standard deviation. In this case, both first moment (the average) and second moment (the standard deviation) are calculated; 2) if the difference is within some percentage, e.g. 20% of the average. In this case, only the first moment (the average) is calculated; or 3) if the difference is within a user defined range of the average, for example any value less than 100. In this case, the range or threshold is not related to the present sampled data, but based on historical or empirical data. With this method, for metrics of interest, when the sample is within the boring range, the data is not reported and the system performance monitor assumes the data is the average. When the sample is outside the boring range, or "interesting", then it is collected and reported.

From a statistical point of view, as an example, if a metric is sampled at a 5-second interval, and summarized and spilled every 15 minutes, the average obtained for the 15-minute spill has a possible error of about 19% at a 99% confidence interval. That is, we can be 99% certain that the error is no more than 19%.

The following is a brief explanation of the relationship between the errors, confidence level, the number of samples collected and their averages. According to the central limit theorem the c % confidence interval for the metric population is from $$\bar{x} - f(c)s/\sqrt{n} \text{ to } \bar{x} + f(c)s/\sqrt{n} \quad (1)$$

where $\bar{x}$ is the sample mean, s is the sample standard deviation, n is the number data in the sample, and f(c) is the (1+c/100)/2 -quantile of the unit normal distribution. One can find f(c) in most statistics books. A few examples are listed in table 1.

TABLE 1

Four confidence intervals, 80%, 90%, 95%, 99%, and their 0.90-0.95-, 0.975-, 0.995- quantile of the unit normal distribution.

| Confidence Interval c | (1 + c/100)/2 | f(c) |
|---|---|---|
| 80% | 0.9 | 1.282 |
| 90% | 0.95 | 1.645 |
| 95% | 0.975 | 1.960 |
| 99% | 0.995 | 2.576 |

Assume that the sample mean is off by +e % from the metric population mean. From (1) we have $$\bar{x} + f(c)s/\sqrt{n} = \bar{x}(1+ee/100) \quad (2)$$

Let $C = s/\bar{x}$ be the coefficient of variation of the sample. Then, from (2), error percent, e %, could be represented in terms of sample size n, C, and f(c)

$$e = \frac{100\sqrt{n}\, f(c)C}{n} \text{ or } n = \left(\frac{100 f(c)C}{e}\right)^2 \quad (3)$$

In the case of a 5-second sample interval, the error percent of the average for the 15-minute spill would be:

$$\frac{100\sqrt{180}\, f(99)C}{180} = 19.2\%$$

The above formula [0047] implies that the confidence interval is 99% and the data values are exponentially distributed, i.e., C=1. In other words, we are 99% sure that the true average (population average) for the 15-minute spill is within +−19.2% of the computed average.

It is quite clear that, because of the uncertainty inherited from the sampling process, storing, transmitting and reporting the interesting values of performance metrics make statistical sense. Formula (3) could likewise be used to determine the boring range based on the sample size and sample coefficients of variation for a given confidence interval.

Note also that for the same sample size, n, and confidence interval, c, the variance would be off by $e_v$ percent:

$$e_v = \frac{100 f(c)^2}{n},$$

which is normally much less than the error for the mean. For the example given above, the variance would be off by only $$\frac{100 f(99)^2}{180} = 3.7\%.$$

In general, the relationship between e and $e_v$ is:

$$e_v = \frac{\sqrt{n}\, f(c)}{nC} e,$$

where C is the coefficient of variation of the data.

Most performance models and modeling formulas only use averages. For instance, the key performance inputs for the models, such as workload throughputs, service times and utilization at servers are average numbers. So are the outputs of the models/formulas. For some more sophisticated modeling formulas, the first two moments may be used. As it is well known to the person skilled in the relevant art, the first moment $\bar{x}$ of a sample is simply the average of the sample. A second moment $\overline{x^2}$ is simply the average of the squared values of the sample. With the first moment and the second moment, the standard deviation may be calculated. Third moment or above are very rarely used. Therefore, in most cases, mean and variance will be enough.

The average referred through out this application may be many different kinds of average, including at least arithmetic or geometric averages, past static averages or running averages including current data, straight averages or weighted averages where some data are more important than others. The averages used by the methods in the current invention may be any one of them, or some combination of them. Different type of averages may be appropriate for different types of metrics with different data distributions. For example, when a given metric has a very large range, then geometric averages may be more appropriate than arithmetic averages. However, for most metrics, arithmetic average may be most appropriate.

One useful average is an hour-by-hour straight average as used in the above example. An alternative is to compute a moving mean over multiple hours, with greater weight assigned to recent hours. A third alternative is to use historical data as well. For instance, average the previous hour with the current hour yesterday. Perhaps the most accurate alternative is to determine how closely the current hour yesterday matched the previous hour yesterday and use that relationship to adjust the average of the previous hour today. The closer the average used is to the real/true mean, the fewer exceptional values have to be reported, which means there will be less data to transmit or store. To obtain a closer average, a running average may need to be maintained and updated regularly. When the current running average differs from the original average by an amount greater than a threshold, the new running average will be reported/transmitted from the agent to the monitoring console. Thus, using a smaller threshold will cause more updated averages to be transmitted. The number of data points (sample size) that are needed, given an error range or boring range (mean +−e %), to make the sampled average within a certain confidence interval, c, to the population average can be determined by formula (3) above.

Another average is the Exponential Moving aVerage (EMV), which is a moving average that may give a greater weight to the latest data. The impact of old data gradually decreases. The current or n'th EMV, denoted by $\overline{d}_n(w)$, is based on the previous or (n−1)'th EMV, $\overline{d}_{n-1}(w)$ and the new or n'th data $d_n$:

$$\overline{d}_n(w) = d_n w + \overline{d}_{n-1}(1-w),$$

where w is a predefined weight, which may be any real number between 0 and 1 inclusive. The most obvious weight to choose is $$w = \frac{w_f}{N}$$

where N is the moving window size and $w_f$ is a weight factor, which is any real number. When $w_f$ is less than 1, then the current data weighs less than the older data. With $w_f=2$, the weight of the current data point is twice as important as the previous data point, etc., although a smaller scaling, say $w_f=1.3$ may be more appropriate for a given metric. If $w_f=1$ and N=n, then $$w = \frac{1}{n},$$

the EMV becomes the straight running average, i.e., $\overline{d}_n(w) = \overline{d}_n$.

For real-time monitoring the average is likely to be updated over time (e.g., using the EMV) rather than computed with all the data points collected so far. The same is true for computing variance as well. The following are two algorithms for updating the average and variance:

Incremental update of average (mean): a process of computing current average, $\overline{d}_n$, with a previous average, $\overline{d}_{n-1}$, and a new data point, $d_n$. The current straight running average can be computed by $$\overline{d}_n = \overline{d}_{n-1} + \frac{d_n - \overline{d}_{n-1}}{n} = [(n-1)\overline{d}_{n-1} + d_n]/n$$

Incremental update of variance: a process of computing current variance, $\sigma_n^2$, with a previous variance, $\sigma_{n-1}^2$, and a new data point, $d_n$. The current variance can be computed by the $S_n/n$ $$\text{Sum of variance} = S_n = \sum_{i=1}^{n}(d_i - \overline{d}_n)^2$$

$$S_n = S_{n-1} + (n-1)(d_n - \overline{d}_{n-1})^2/n$$

$$\sigma_n^2 = S_n/n.$$

Once the average and standard deviation are determined, the boring range may be selected. The selection of the "boring range" and the size of it will determine the amount of reduction in monitoring data collected, stored and/or transferred. The larger the range of the "boring range," the fewer of data become "interest" and get transmitted from agent to console, the greater in the reduction of data transmitted.

Quantitatively speaking, the less varying the data is, the fewer numbers need to be recorded. One could use a reliability function, R(x) [which is defined to be $P(X \geq x)$], if one knows the distribution. For most of the common (non-power-tailed) distributions, $P(X \geq x)$ decays exponentially. The power-tailed distribution can be detected using the methods presented in Pat. No. 6,564,174, entitled "Enterprise management system and method which indicates chaotic behavior in system resource usage for more accurate modeling and prediction." It is incorporated herein by reference.

That means that the amount of data that needs to be collected/transmitted decreases drastically as the thresholds go up, i.e., defining a wider boring range. For example, assuming that the value of a performance metric is exponentially distributed, i.e., its distribution function, F(x), is:

$$F(x) = 1 - e^{-\lambda x}, 0 \leq x < \infty.$$

Therefore, $P(X \geq x) = 1 - F(x) = e^{-\lambda x}$.

So, if one let x to be (mean+standard deviation), then only about 14 percent of data points needs to be stored. If x is (mean+2 times the standard deviation), then only about 5 percent of data points needs to be kept. See Table 3 below.

Even if one does not assume any underlying distribution for the performance metrics, one can use Chebyshev's inequality to estimate the reduction in data volume.

$$P(X \geq x) \leq \frac{\sigma^2}{\sigma^2 + x^2}, \tag{4}$$

where $\sigma^2$ is the variance.

Formula (4) is distribution independent. One drawback is that it does not have a very tight upper bound. Table 2 shows some examples with a normal distribution. Table 3 shows an example for exponential distribution in which the tail of the distribution reduces much more slowly and for which the Chebyshev's upper bound is a little tighter.

TABLE 2

The Probability of a particular sample value exceeds a predefined threshold x for a normal distribution.

| x | $P(X \geq x)$ | Chebyshev's Upper Bound |
|---|---|---|
| Mean + σ | 15.9% | 50% |
| Mean + 2σ | 2.3% | 20% |
| Mean + 3σ | 0.13% | 10% |

TABLE 3

The Probability that a particular sample value exceeds a predefined threshold x for an exponential distribution.

| x | $P(X \geq x)$ | Chebyshev's Upper Bound |
|---|---|---|
| Mean + σ | $e^{-2}$ = 13.5% | 20% |
| Mean + 2σ | $e^{-3}$ = 5.0% | 10% |
| Mean + 3σ | $e^{-4}$ = 1.8% | 5.9% |

Usually, only large values are "interesting." Since, in general, half the values that differ from the mean by a large amount are small values, significant additional savings can occur by only storing large values that exceed the threshold. When only large values are of concern, the boring range can be defined as 0 through (Mean+3σ).

Figure 6:
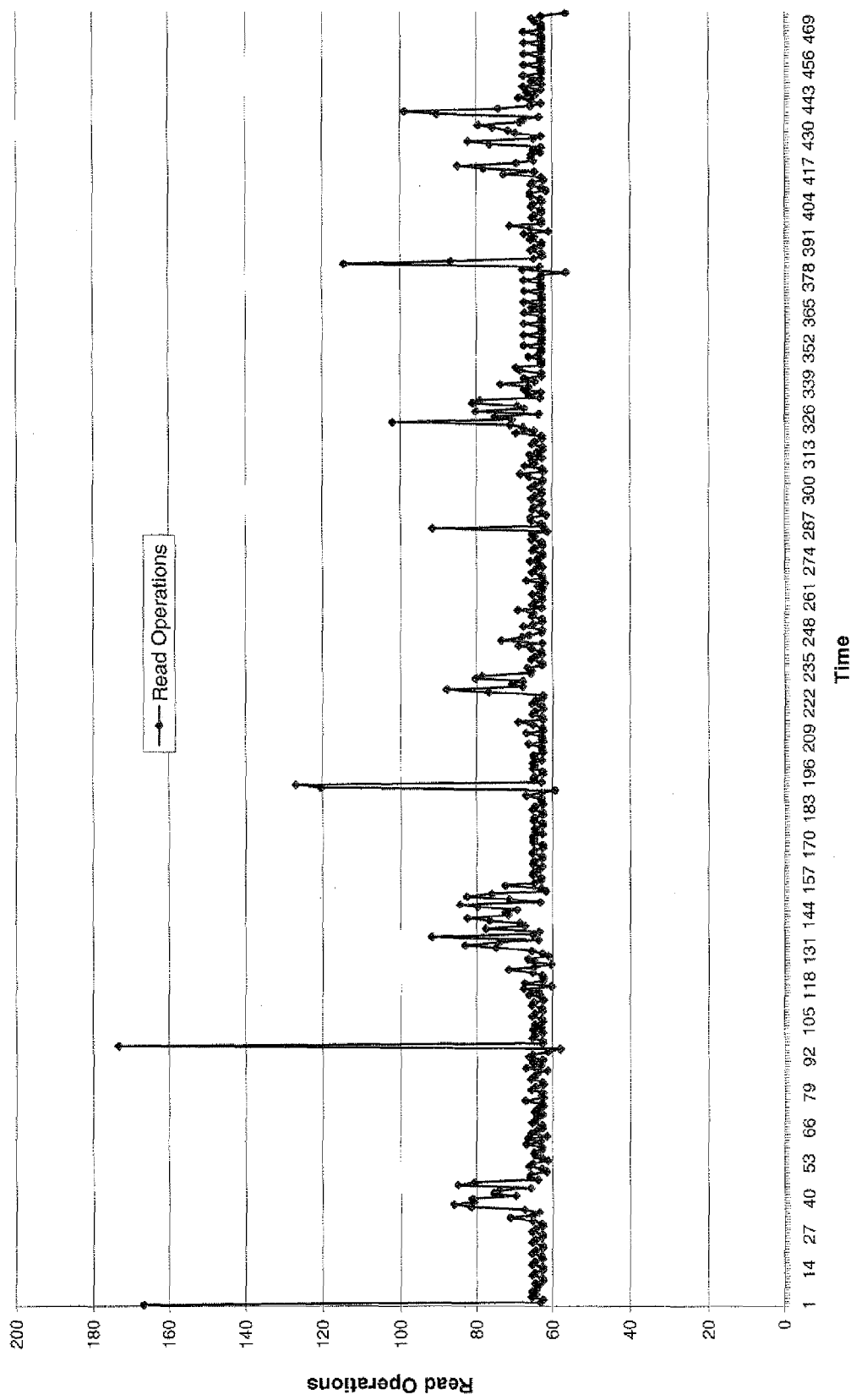
FIGS. 6 through 13 are examples of measured performance metrics with or without use of the disclosed method or system of the current invention.
Figure 7:
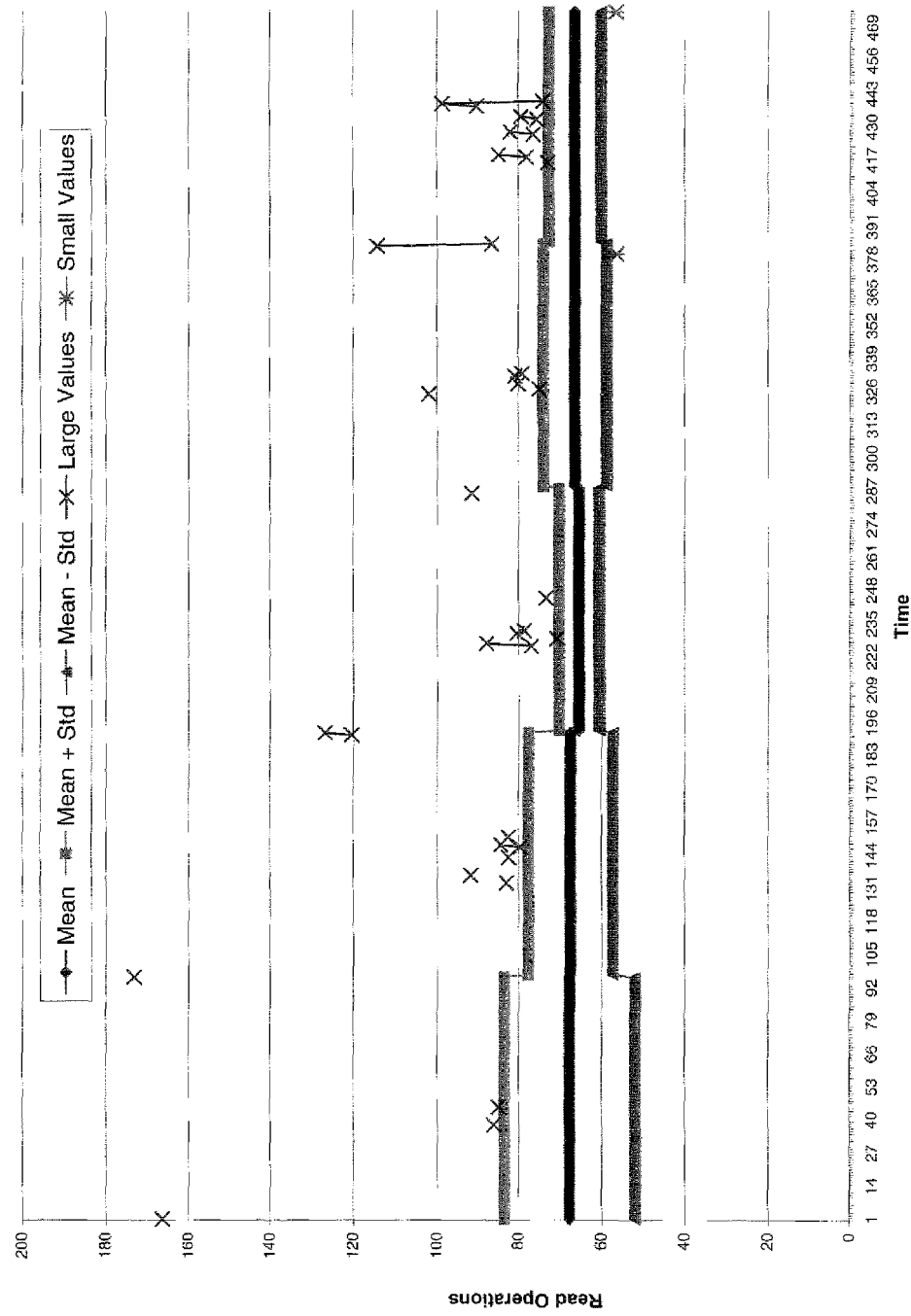

In operation according to an embodiment of the current invention, when a system metric is to be monitored and analyzed for system performance for a node 300, an agent 302 will collect samples of the metric for a period of time to establish a baseline, if no baseline measurement is already done yet. From the baseline measurement, an average, standard deviation can be calculated. A boring range may be selected. Using mean and the standard deviation, for example the boring range is from $(\overline{d}_n - a\sigma_n)$ to $(\overline{d}_n + b\sigma_n)$, where a and b are some real numbers. Depending on the metric, the lower bound and the upper bound do not need to be symmetric. For example, the lower bound may be larger while upper bound is smaller, e.g. the boring range is $(\overline{d}_n - 3\sigma_n)$ to $(\overline{d}_n + \sigma_n)$. The measurement period may be selected as 1 hour. Moreover, and as mentioned earlier, a boring threshold (as opposed to a boring range) may also be suitable for some metrics, in which case only one bound is defined, e.g. set a boring threshold as $(\overline{d}_n + \sigma_n)$, any value below the threshold is boring. The measurement period may vary depending on user preferences, but might usually be expect to be on the order of one hour FIGS. 6 and 7 illustrate an example in which the disclosed data reduction method is used to store, transmit, and report a certain metric, in this case the number of read operations that are performed at a given node as a function of time. FIG. 6 shows the raw data while FIG. 7 shows the data reported after using one of the data reduction methods of the current invention. The raw data, constituting 475 data points, is shown in FIG. 6, in which each time increment along the X-axis represents the number of read operations occurring within a five-second interval. A non-exponential running average and standard deviation are calculated every 95 time increments or so, and thus the mean and standard deviation are recomputed every 8 minutes or so, as can be seen in FIG. 7. Of course, the initial mean and standard deviation will be computed on the basis of some sort of historical data, which is not shown in the Figures for clarity. From this running mean and standard deviation calculation, a boring range is defined, which in this simple example represents the mean plus-or-minus one standard deviation. As noted earlier, boring values within the boring range are not reported. Thus, as shown in FIG. 7, when the boring values are removed, only 53 of the original 475 data points are deemed to be interesting and are reported, which represents approximately a nine-fold reduction in the amount of data that the monitoring system need deal with.

Moreover, it can be seen that some of these interesting data points are either above the boring range ("large values") or below the boring range ("small values"), and in this case only two of the 53 data points constitute such small values. Such large or small data points, when reported, may be treated differently be the system, as they may suggest different issues requiring different actions. However, it should be noted that this particular exemplary metric, read operations, is generally only interesting for monitoring purposes when large values occurs. Accordingly, in an alternative embodiment, one skilled in the art should note that only the upper bound for the metric (mean+one standard deviation) may be utilized for reporting purposes, which in effect would define a boring threshold as opposed to a boring range. If so configured, the number of interesting data points would be further reduced from 53 to 51, i.e., excluding the two small data values. In any event, whether defined by boring threshold or a boring range, the data that the system must handle is accordingly reduced.

Still referring the example shown in FIGS. 6 and 7, the averages of the data change very little over time, although the standard deviations change a little more. In this case, the historic average and standard deviation may be used to define the boring range which would provide similar data reduction. FIG. 7 shows two border lines of the boring range, using only historic average and standard deviation. In this case, the number of interesting values is only about 12, rather than 53. For this example, using fixed average and boring range, data reduction would possibly be almost 40-fold.

Figure 8:
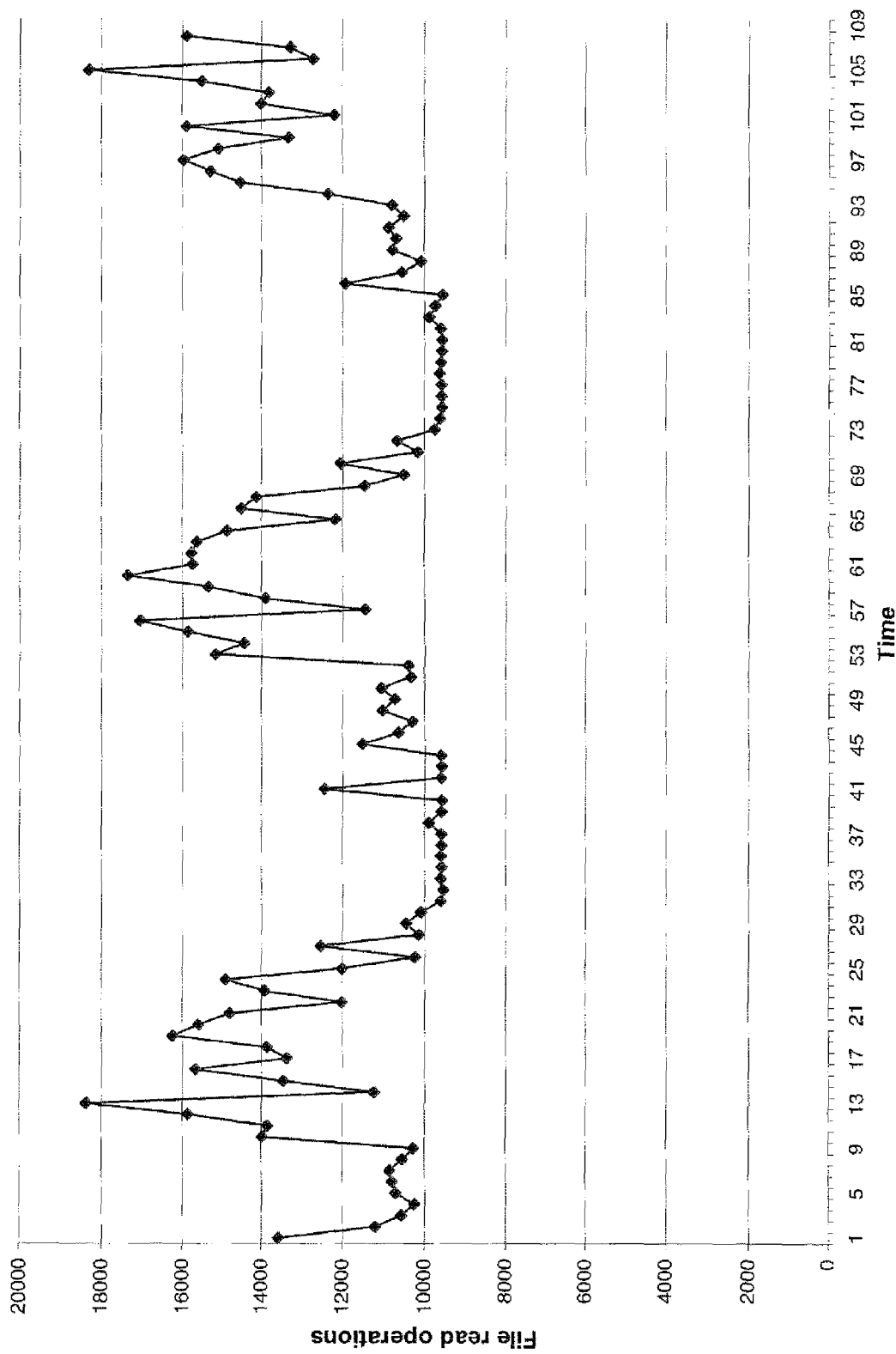
Figure 9:
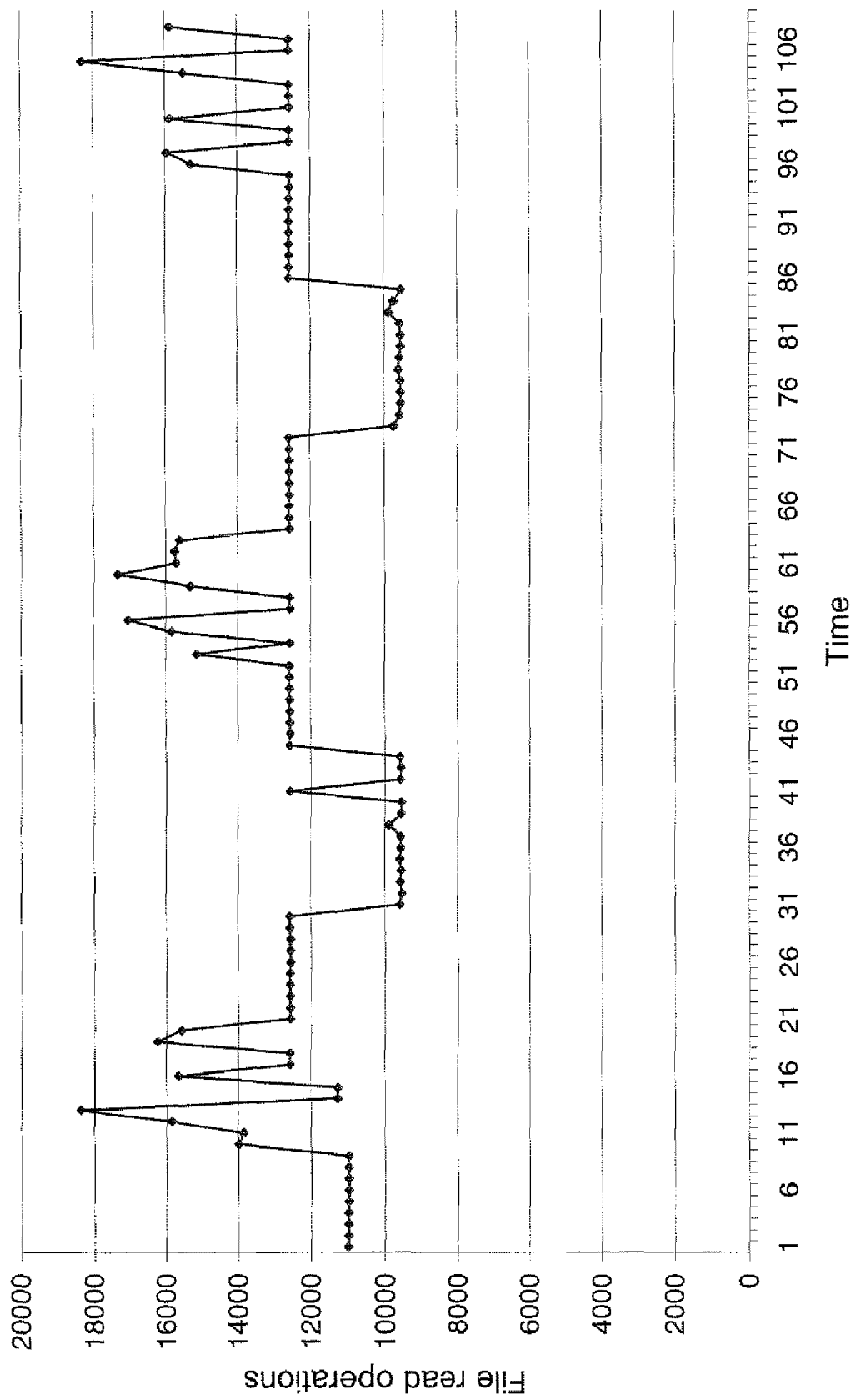

Another example is shown in FIGS. 8-9, File read operation data. The raw data in FIG. 8 shows the number of file read operation during each 15-minute interval. In FIG. 9, data close to the mean is replaced by the mean and the mean is updated along with the sampling. The interesting data reported is about one fifth of the raw data.

FIGS. 10-13 present two more sets of examples showing the results of this embodiment of the current invention. In these two examples, rather than using predetermined fixed boring range based on historic data, the boring range are determined based on measured data. In these two examples, a method according to another embodiment of the current invention is employed such that the boring range is adjusted to match the moving trend in metrics.

Figure 10:
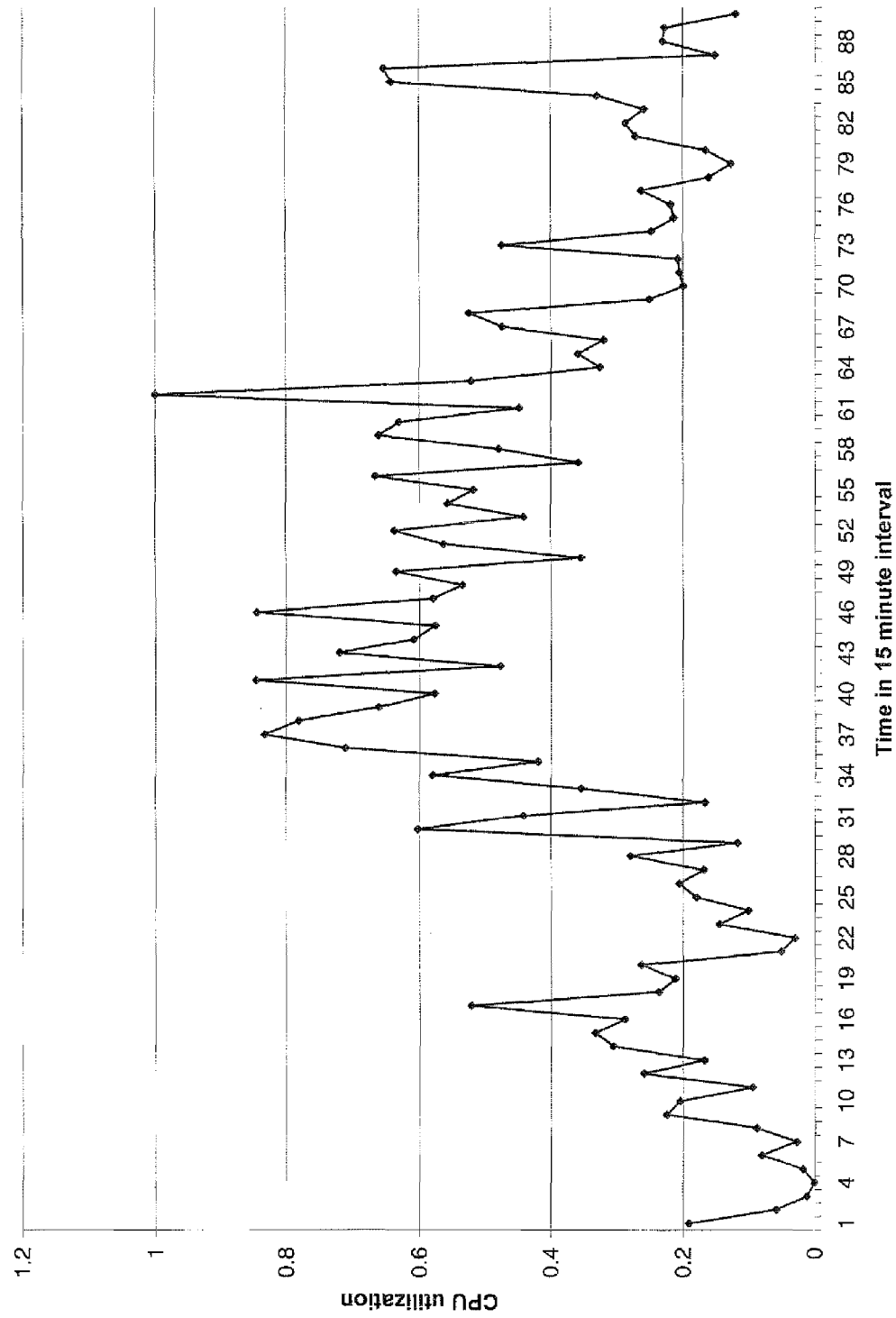
Figure 11:
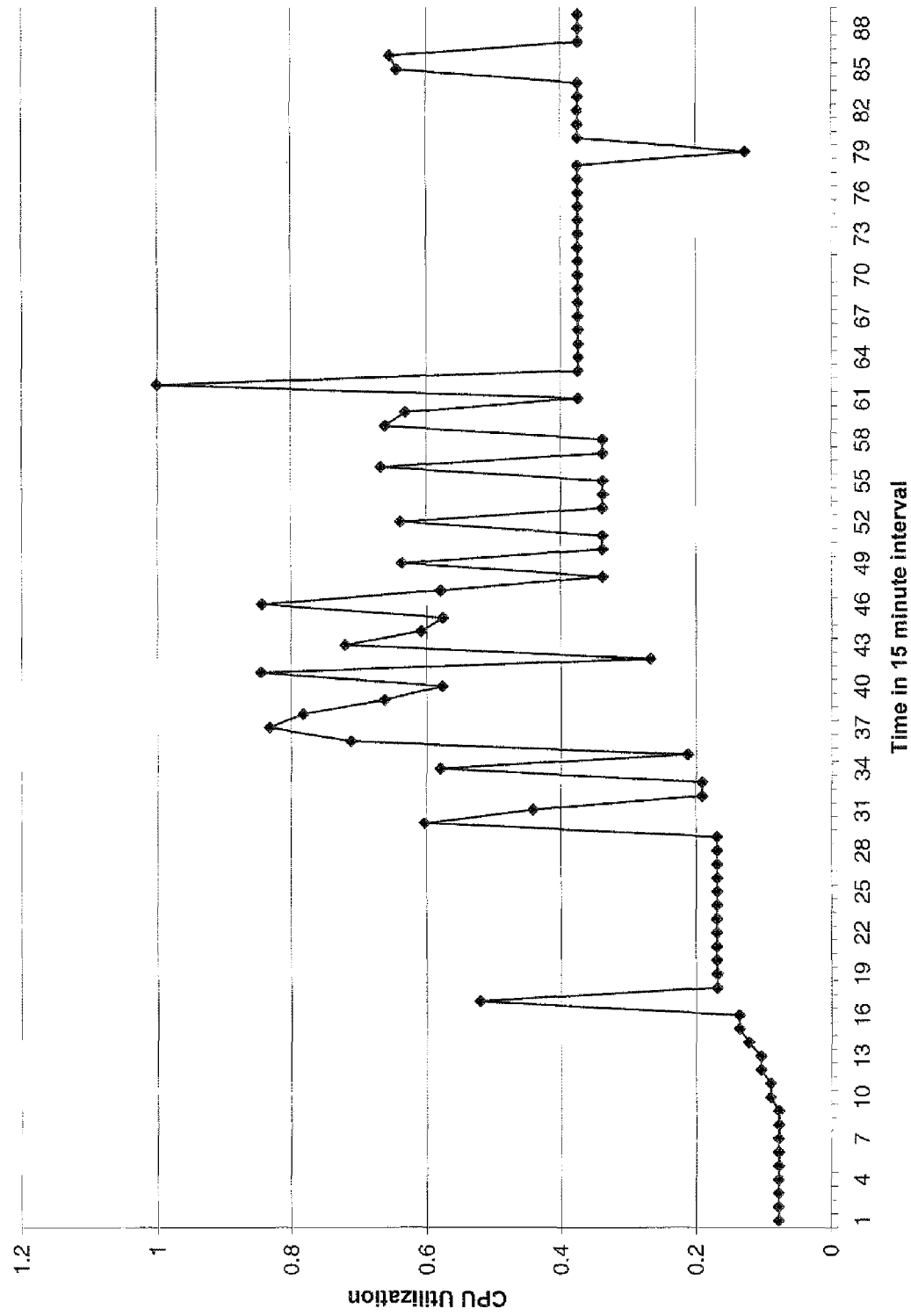

FIGS. 10-11 show CPU utilization over 22 hours, with computed standard deviation and running average. The FIG. 10 shows the original values. If a boring threshold is set based on historic data, as shown in FIG. 10, represented by a thick line, there are very few data points are boring. The data reduction is not substantial. A different data reduction method may be more suitable for this type of metrics.

The FIG. 11 shows the original values when they differ from the running average by more than the standard deviation and shows the running average when it is closer. In FIG. 11, less than half the data points of FIG. 10 are shown, i.e. reported. In FIG. 11, 24 points are outside the boring range of the standard deviation, or are "interesting," as denoted by diamonds. The moving average changed 12 times. Each time the moving average changes exceeding the predetermined threshold, the new average is reported to the monitor and will be used by the monitor in the future. Each new average is represented by a solid circle in FIG. 11. When a data point is within the boring range, it is replaced by the running average. These "boring" data point, which is replaced by the running average, is represented by a solid line. Since no data point is reported, no data point is displayed. In this example, there are 24 interesting data point and 12 changes of running average. Thus 36 values are reported instead of 90. The data reduction is about 3 times. FIG. 11 has less noise and all the important information in FIG. 10. So it actually highlights better what is important. In this example, when the running average change exceeds a defined criterion, then the running average is reported from the agent node to the console node, such that the console node may replace the old average with the new running average. The criteria of change may be based on the standard deviation calculated. In this example, one standard deviation is the criteria, i.e. when the current running average differs from the original running average (the average's initial value, which is also the average stored on the console) greater than the standard deviation, then the new running average is reported. The size of criteria is a trade-off between more raw data reporting (with poor average) or more averages reporting (with accurate average).

Figure 12:
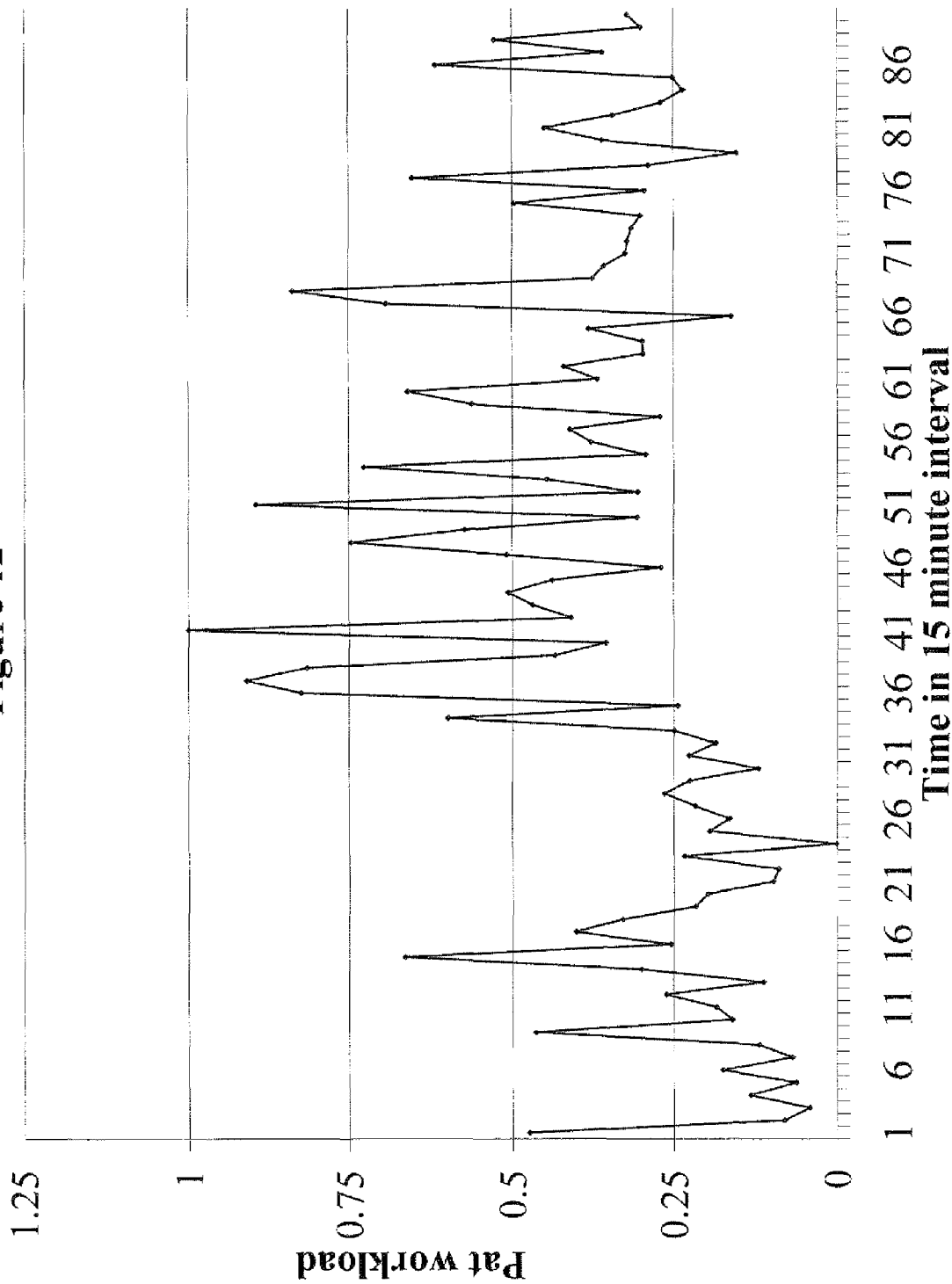
Figure 13:
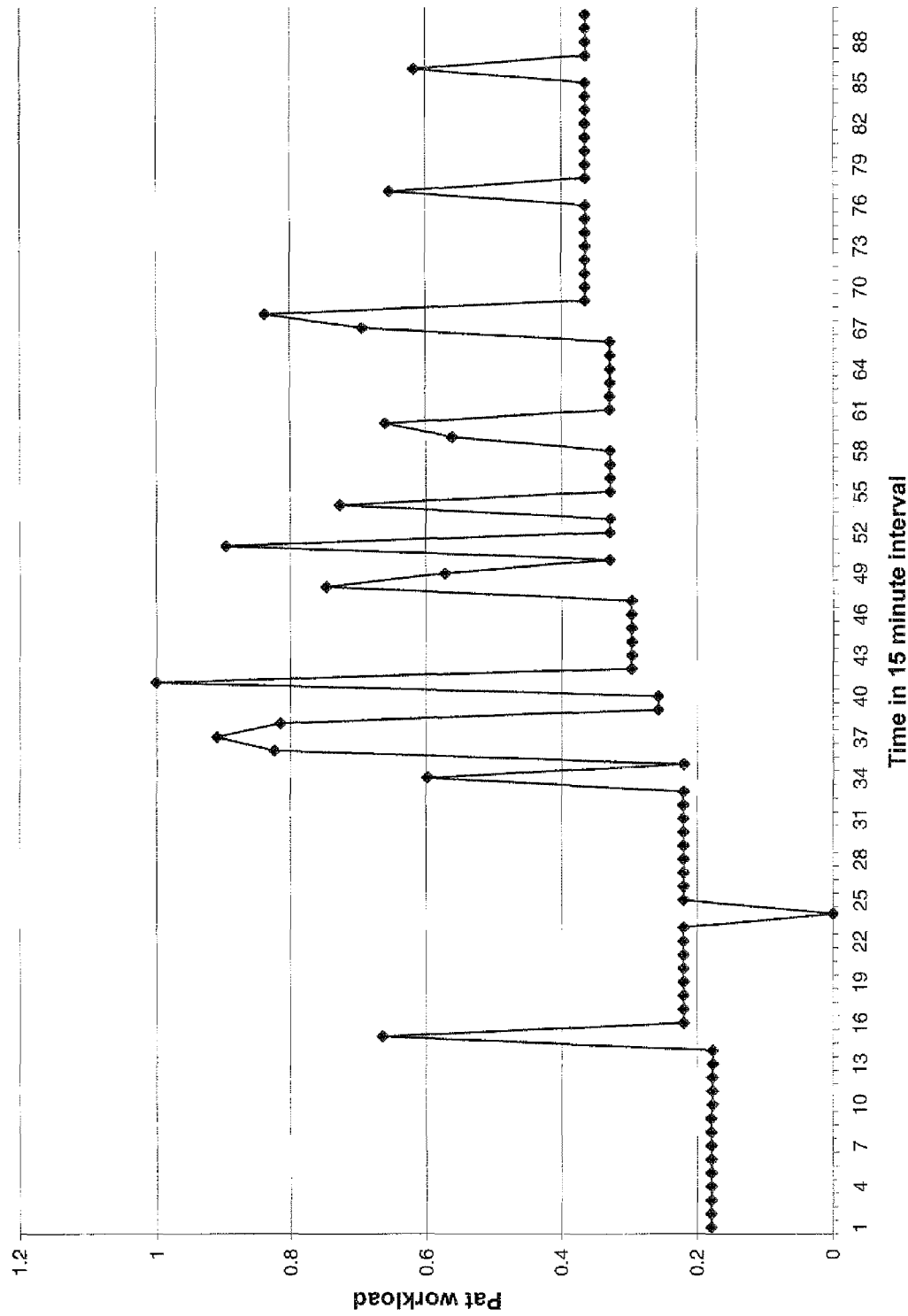

FIG. 12-13 show another work load data, with or without statistical data reduction. In this example, the single fixed threshold does not provide sufficient data reduction, as illustrated in FIG. 12. In FIG. 13, the running average is used, similar to the one used in the example in FIGS. 10-11. The average in FIG. 13 has changed 5 times during the monitoring period. After using the running average to update the average over time, the data reduction is about 4 times. Beside the data reduction, FIG. 13 also highlights the data trend that is not visible in the original data as shown in FIG. 12. Therefore, the method according to an embodiment of the current invention not only reduce the number of data points reported, but also reveals important information regarding the metric that is not obvious in the original raw data of the metric.

Even though the amount of data reduction using this embodiment of the current invention may vary, depending on the type of metrics monitored, their distributions, errors tolerated, in all cases, the data reductions are substantial. It also provides a side benefit, i.e. highlighting the extraordinary events, which are most important to system performance monitoring and analysis.

Figure 14:
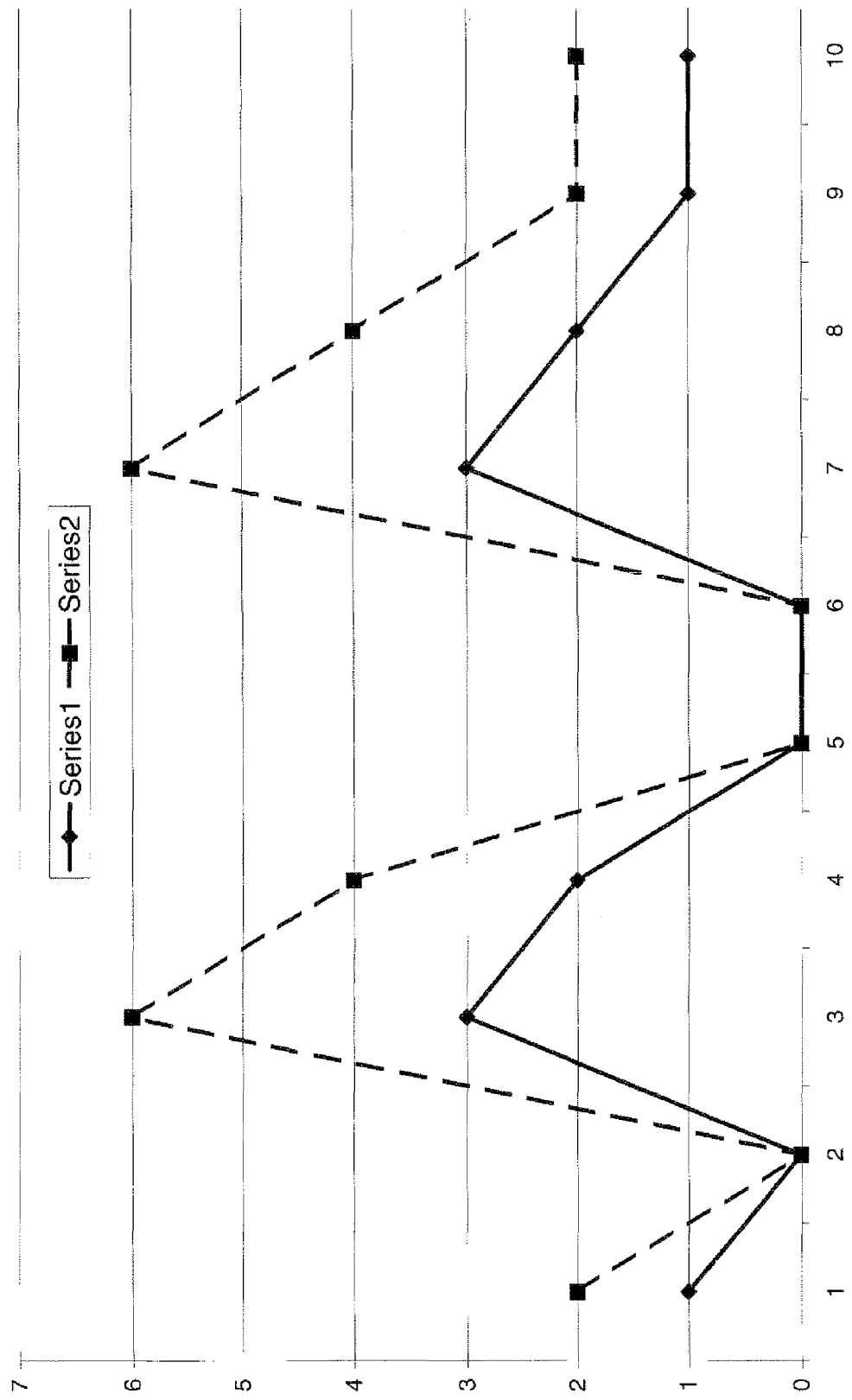
FIGS. 14-17 are examples of two series of metrics with different correlation coefficients.
Figure 15:
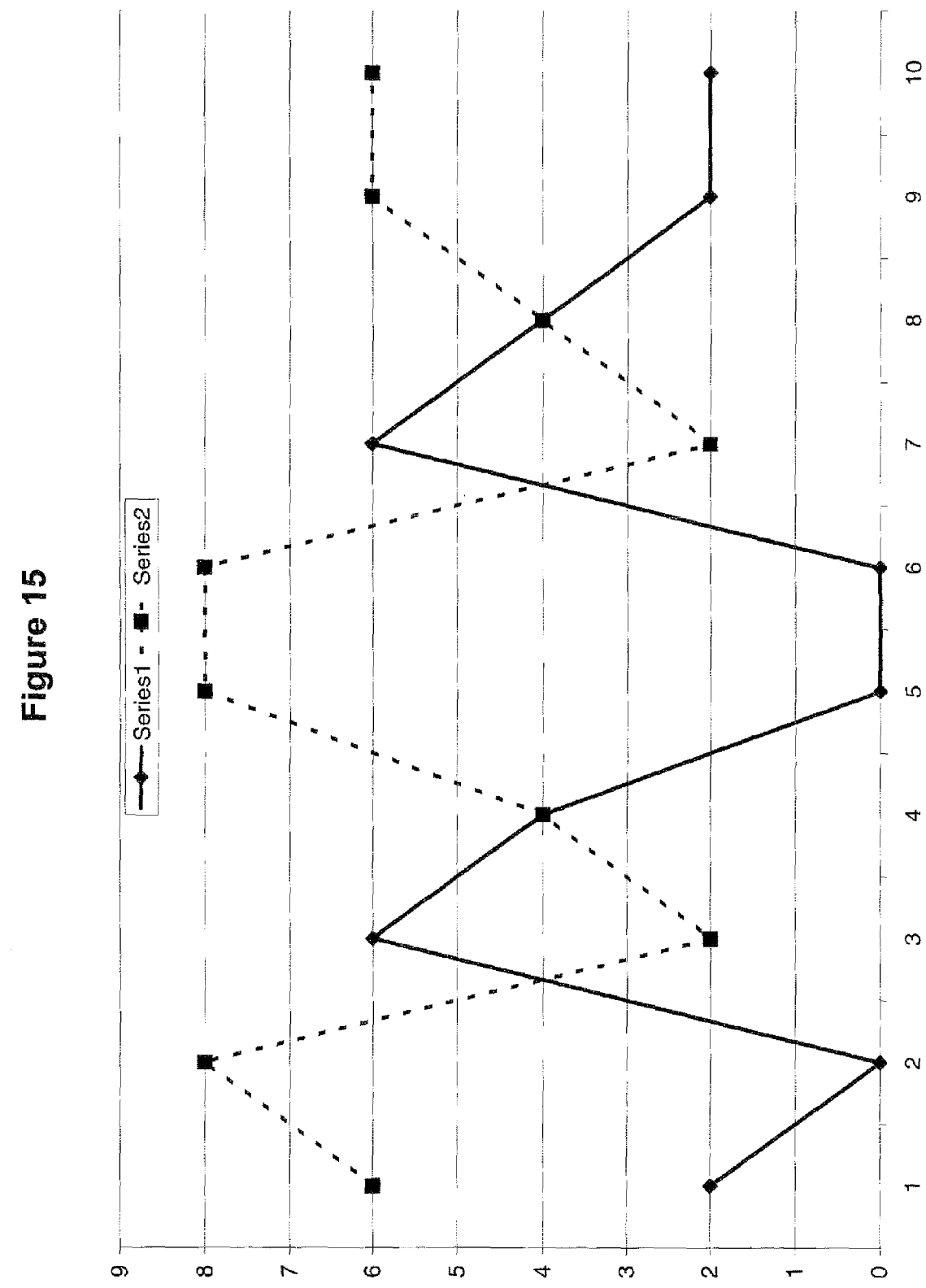
Figure 16:
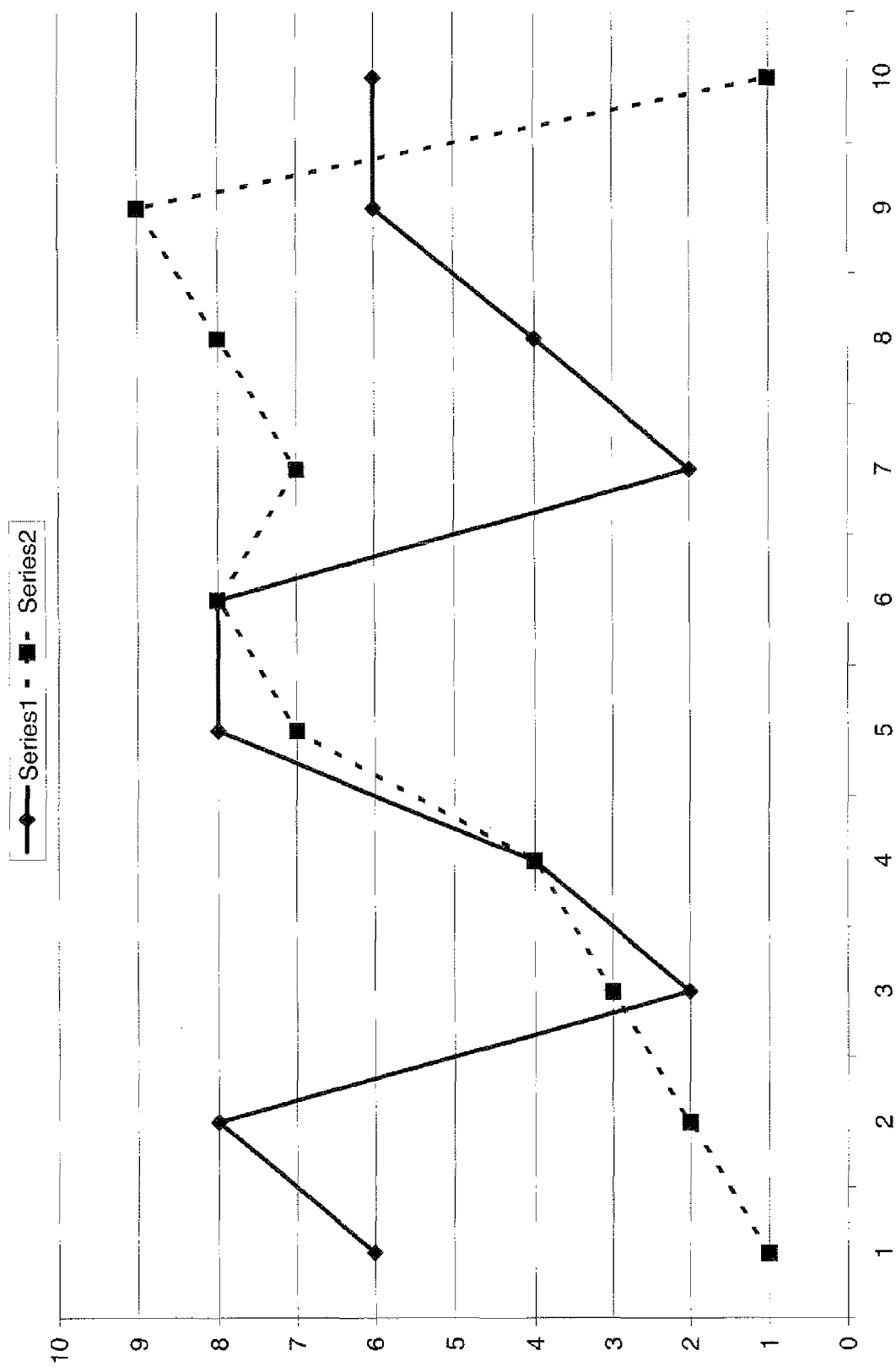
Figure 17:
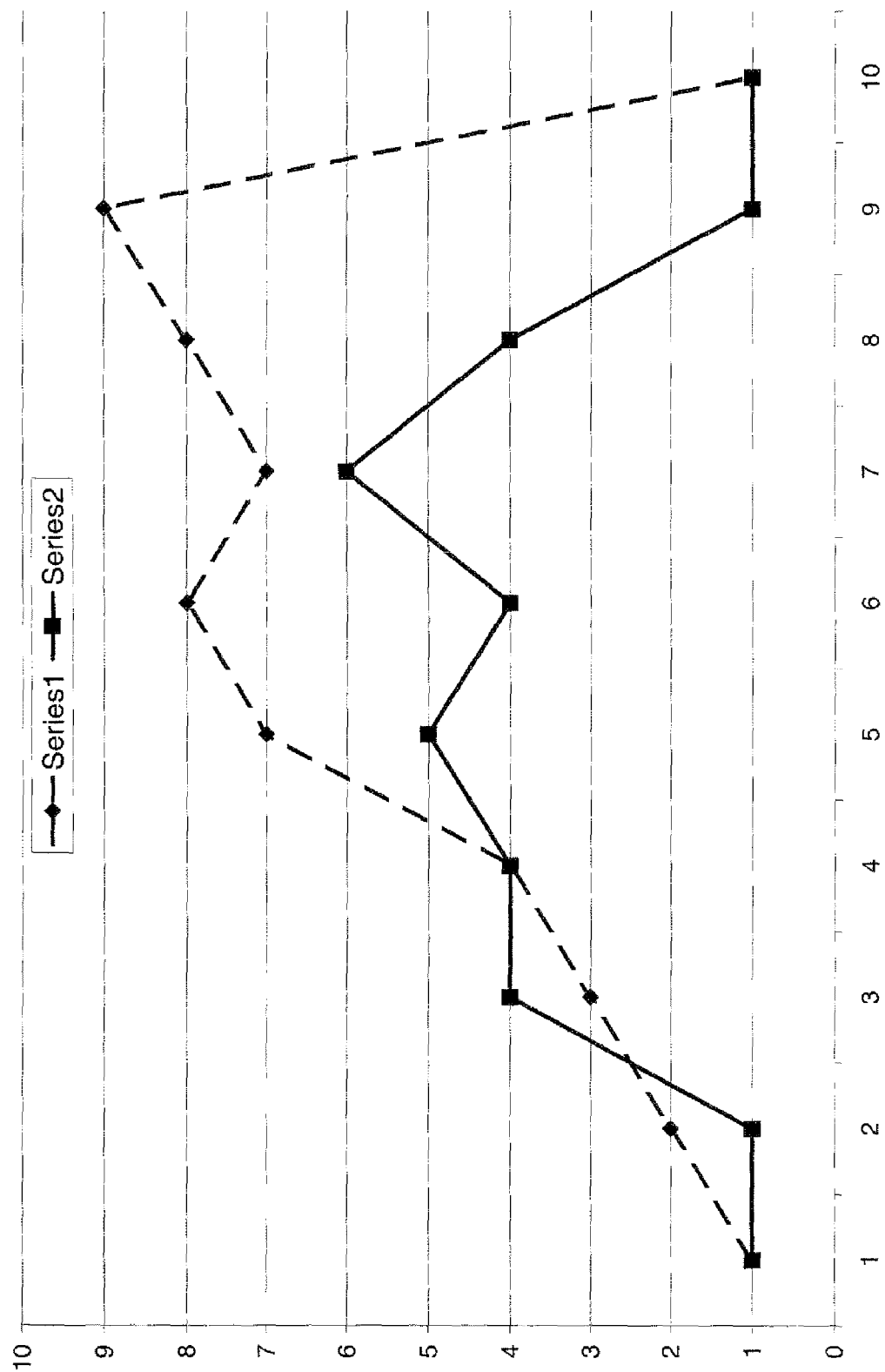

Another method to reduce the number of data collected, transferred between agent 302 and monitor console 420, is to reduce the number of metrics measured and monitored. When two or more metrics are highly correlated, then only the most important metric is measured, collected and transferred to the monitor console 420. The performance or activities of the other correlated metrics may be inferred from the reported metric. The correlation between two metrics can be measured by their correlation coefficient. A correlation coefficient is always between −1 and positive +1 (inclusive). When the correlation coefficient is +1, then the sequences have the identical shape or are completely related, as illustrated in FIG. 14. If the correlation coefficient is −1, then the two sequences are out of phase or moving in the completely opposite direction, as illustrated in FIG. 15. In both cases, when correlation coefficients are +1 or −1, the knowledge of one data sequence will provide complete knowledge regarding the trend of the other data sequence. Therefore, only the data for one sequence is needed for the performance monitoring or analysis for both data sequences. When the correlation coefficient equals to 0, the two data sequences are said to be independent, that is there is no relationship between the two sequences, as illustrated in FIG. 16. When the absolute value of correlation coefficient is between 0 and 1, there is some relationship between the two data sequence, as illustrated in FIG. 17, where the correlation coefficient is 0.5.

When two metrics are highly correlated (for example the absolute value of the correlation coefficient is over some permissible threshold, e.g. 0.7), then it can be inferred that one will have a peak value when the other has a peak value. And when one metric reaches a trough then the other metric reaches a trough at the same time. Therefore knowing the movement of one metric, the movement of the other metric can be inferred. Based on the level of confidence c required, the amount of error e allowed, the sample size n can be determined, as described above.

Accordingly, and on the basis of historic data, once the absolute value of the correlation coefficient is calculated and determined to be above the threshold, only the first metric will be sampled and reported, as described above. The second metric will not be sampled or reported. When the first metric has an "interesting" value and is reported, in one embodiment, the console may estimate the value of the second metric based on the correlation coefficient and the stored historic data. In another embodiment, the second metric is assumed to be the same as the first metric and the second metric is no longer monitored or analyzed.

Figure 18:
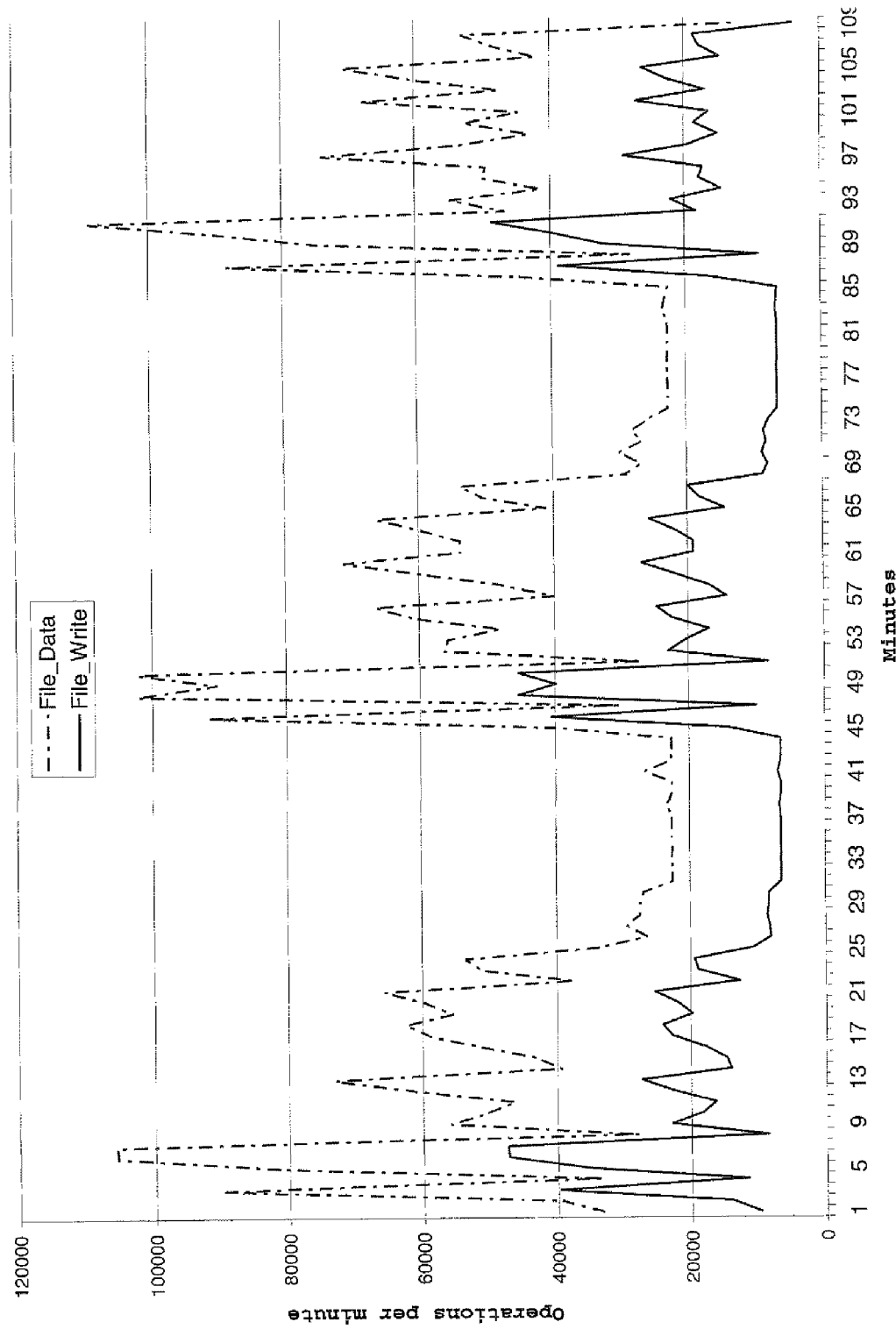
FIG. 18 shows an example where two metrics are closely correlated such that one metric can be used to represent the other.

FIG. 18 shows one example where two metrics are closely correlated. As shown in FIG. 18, the file data operation and file write operation have a correlation coefficient of about 0.98. Therefore, peaks and troughs of the two metrics coincide. We can infer that allertable value of one will be allertable value of the other. Therefore, only one metrics is necessary to be monitored and measured.

Figure 19:
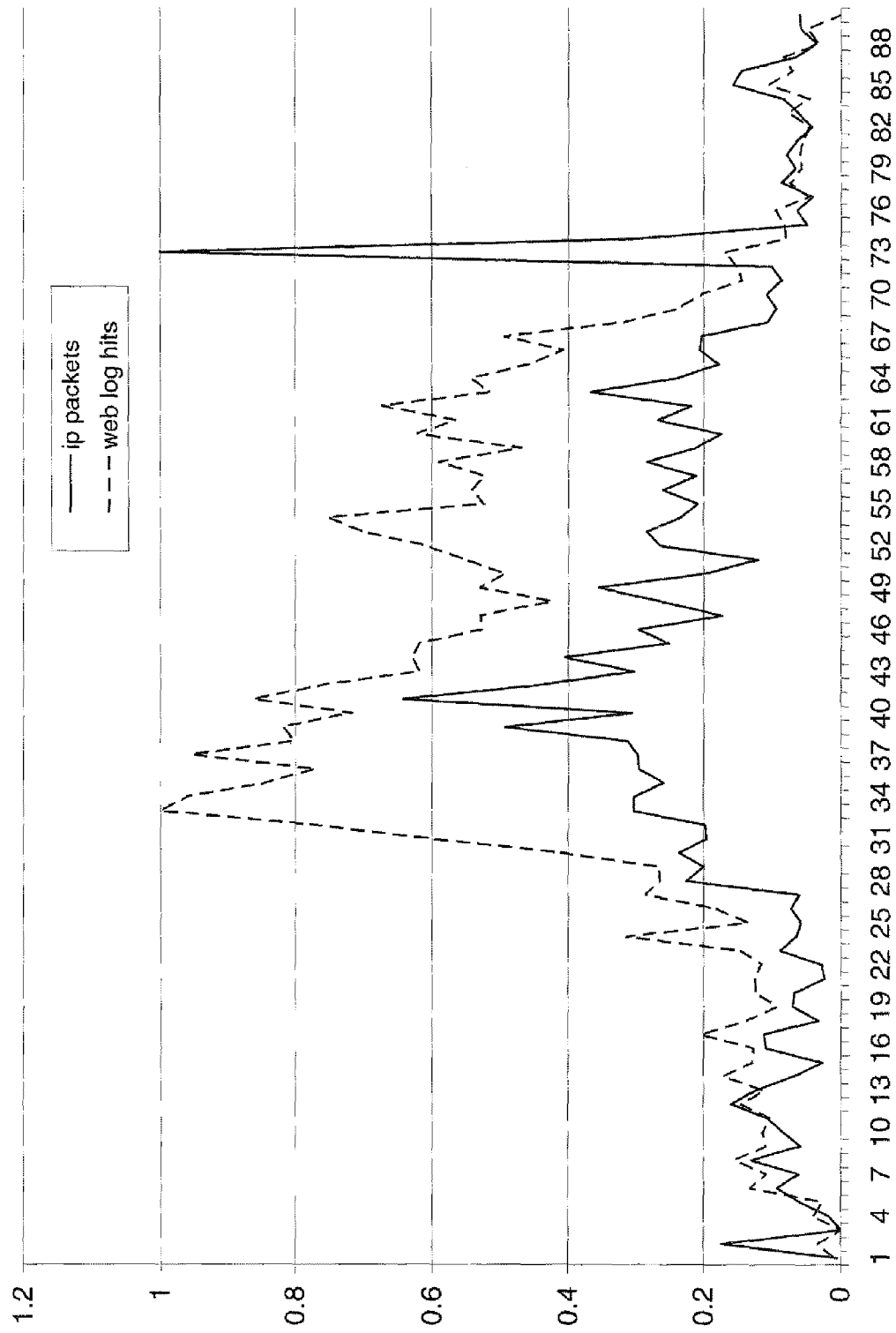
FIG. 19 shows an example where two metrics are not closely correlated such that both metrics have to be reported and monitored.

On the other hand, as shown in FIG. 19, the IP packets and web log hits have a correlation coefficient of 0.62. The trend of activity in IP packets therefore does not closely coincide with web log hits, and thus knowledge in one does not provide enough information to discern the performance of the other. If both metrics are necessary for performance monitoring, then both metrics have to be sampled and reported. Typically, the threshold of the absolute value of correlation coefficient is set at about 0.7. In some situations, higher threshold may be set, e.g. at 0.9 or 0.95. The higher the threshold, the more metrics need to be monitored.

While illustrative embodiments of the invention have been illustrated and described, it will be appreciated that various changes can be made therein without departing from the spirit and scope of the invention as defined by the appended claims and their equivalents.

The invention claimed is:

1. A computer-implemented method of reducing reporting of system metrics, the method comprising:
   obtaining first sampled values of a first system metric with at least one agent;
   determining a weighted moving average of a plurality of the first sampled values;
   deriving a non-reporting range from the weighted moving average, the non-reporting range defined by at least one threshold parameter determined from the weighted moving average; and
   withholding reporting of one or more of the first sampled values to a system performance monitor only if the one or more first sampled values are within the non-reporting range,
   wherein the weighted moving average includes an exponential weighted moving average $\bar{d}_n(w)$ for an n'th sample of the first system metric, and wherein the exponential weighted moving average $\bar{d}_n(w)$ is determined from an exponential weighted moving average $\bar{d}_{n-1}(w)$ for an (n−1)'th sample and a weight w, where $\bar{d}_n(w) = d_n w + \bar{d}_{n-1}(1-w)$.

2. The method of claim 1, further comprising reporting one or more of the first sampled values to the system performance monitor only if the one or more first sampled values are outside the non-reporting range.

3. The method of claim 2, further comprising;
   receiving, at the system performance monitor, the one or more first sampled values reported; and
   assuming, at the system performance monitor, an average for the one or more first sampled values not reported.

4. The method of claim 1, wherein the at least one threshold parameter is determined by a standard deviation of the weighted moving average.

5. The method of claim 1, wherein the at least one threshold parameter is determined by a percentage of the weighted moving average.

6. The method of claim 1, wherein the weight w equals c/N, wherein c is a real number for a weighting factor, and N is an integer for a window size of samples.

7. The method of claim 6, wherein the weight w is between 1/N and 2/N.

8. The method of claim 6, wherein the window size N is determined by a confidence interval cl, the tolerable variance error $e_v$, wherein $$e_v = \frac{100 f(cl)^2}{N},$$

wherein f(cl) is the (1+cl/100)/2-quantile of the unit normal distribution.

9. The method of claim 6, wherein the weighting factor c equals 1, and wherein the window size N equals n for the n'th sample of the first system metric, whereby the exponential weighted moving average $\bar{d}_n(w)$ is a running average $\bar{d}_n$ for the n'th sample of the first system metric.

10. The method of claim 9, wherein the act of deriving the non-reporting range comprises:
    calculating a first threshold parameter for the non-reporting range to be $(\bar{d}_n - a\sigma_n)$, and
    calculating a second threshold parameter for the non-reporting range to be $(\bar{d}_{n+b\sigma n})$, wherein a and b are two constant real numbers,
wherein $\sigma_n$ is a standard deviation for the n'th sample of the first system metric, and
wherein the non-reporting range is defined between the first and second parameters.

11. The method of claim 9, wherein the running average $\bar{d}_n$ is incremented using a running average $\bar{d}_{n-1}$ for the (n−1)'th sample of the first system metric and a first sample value $d_n$ for the n'th sample by computing $$\bar{d}_n = \frac{(n-1)\bar{d}_{n-1} + d_n}{n}.$$

12. The method of claim 9, wherein the standard deviation $\sigma_n$ for the running average $\bar{d}_n$ is determined from a current variance $\sigma_n^2$ calculated by $\sigma_n^2 + S_n/n$, wherein $S_n = S_{n-1} + (n-1)(d_n - \bar{d}_{n-1})^2/n$, and wherein $$S_n = \sum_{i=1}^{n}(d_i - \bar{d}_n)^2.$$

13. The method of claim 1, wherein the act of withholding reporting of the one or more first sampled values to the system performance monitor only if the one or more of the first sampled values are within the non-reporting range further comprises:
calculating a running average $\bar{d}_i$ of a plurality of the first sample values; and
reporting the running average $\bar{d}_i$ to the system performance monitor.

14. The method of claim 13, further comprising:
calculating a new running average $\bar{d}_j$ of a plurality of the first sample values; and
reporting the new running average $\bar{d}_j$ instead of the former running average $\bar{d}_i$ to the system performance monitor if $|\bar{d}_i - \bar{d}_j|$ is greater than a replacement threshold.

15. The method of claim 13, wherein the replacement threshold is a standard deviation $\sigma_n$ for the new running average $\bar{d}_i$.

16. The method of claim 1, further comprising:
obtaining second sampled values of a second system metric with at least one agent;
calculating a correlation coefficient cc between a plurality of the first and second sampled values;
determining an absolute value of the correlation coefficient cc; and
withholding reporting of the plurality of second sample values to the system performance monitor if the absolute value |cc| is greater than a threshold.

17. The method of claim 16, further comprising discontinuing the act of obtaining second sampled values of the second system metric if the absolute value |cc| is greater than the threshold.

18. The method of claim 16, further comprising:
reporting one or more of the second sampled values to the system performance monitor if the absolute value |cc| is less than the threshold; and
continuing the act of obtaining second sampled values of the second system metric with at least one agent.

19. A program storage device, readable by a programmable control device, comprising instructions stored on the program storage device for causing the programmable control device to perform a method according to any one of claims 1 through 18.

20. A computer-implemented method of reducing reporting of system metrics, comprising:
obtaining first sampled values of a first system metric with at least one agent;
reporting one or more of the first sampled values to a system performance monitor;
obtaining second sampled values of a second system metric with at least one agent;
calculating a correlation coefficient cc between a plurality of the first and second sampled values;
determining an absolute value of the correlation coefficient cc; and
withholding reporting of the plurality of second sampled values to the system performance monitor if the absolute value |cc| is greater than a threshold,
wherein the obtaining the first sampled values includes deriving a non-reporting range defined by at least one threshold parameter determined from a weighted moving average of the first sampled values, and the reporting one or more of the first sampled values to a system performance monitor includes withholding reporting of one or more of the first sampled values only if the first sampled values are within the non-reporting range, and
wherein the weighted moving average includes an exponential weighted moving average $\bar{d}_n(w)$ for an n'th sample of the first sampled values, and wherein the exponential weighted moving average $\bar{d}_n(w)$ is determined from an exponential weighted moving average $\bar{d}_{n-1}(w)$ for an (n-1)'th sample and a weight w, where $\bar{d}_n(w) = d_n w + \bar{d}_{n-1}(1-w)$.

21. The method of claim 20, further comprising discontinuing the act of obtaining second sampled values of the second system metric if the absolute value |cc| is greater than the threshold.

22. The method of claim 20, further comprising:
reporting one or more of the second sampled values to the system performance monitor if the absolute value |cc| is less than the threshold; and
continuing the act of obtaining second sampled values of the second system metric with at least one agent.

23. The method of claim 20, wherein the absolute value |cc| is greater than the threshold the method further comprises estimating a value for the second system metric at the system performance monitor by using the correlation coefficient and a plurality of the second sampled values.

24. The method of claim 20, wherein if the absolute value |cc| is greater than the threshold, the method further comprises assuming at the system performance monitor that values for the second system metric are the same as the first sampled values reported.

25. The method of claim 20, wherein if the absolute value |cc| is greater than the threshold, the method further comprises estimating a value for the second system metric at the system performance monitor by using the first sampled values reported.

26. A program storage device, readable by a programmable control device, comprising instructions stored on the program storage device for causing the programmable control device to perform a method according to any one of claims 20 through 25.

* * * * *

UNITED STATES PATENT AND TRADEMARK OFFICE
CERTIFICATE OF CORRECTION

PATENT NO. : 8,000,932 B2
APPLICATION NO. : 11/277307
DATED : August 16, 2011
INVENTOR(S) : Yiping Ding et al.

It is certified that error appears in the above-identified patent and that said Letters Patent is hereby corrected as shown below:

In column 14, line 49, in claim 8, delete "$e_{v:}$," and insert -- $e_v$, -- therefor.

In column 14, line 67, in claim 10, delete "$(\overline{d}_{n+b\sigma n})$," and insert -- $(\overline{d}_n + b\sigma_n)$, -- therefor.

In column 15, line 18, in claim 12, delete "$\sigma_n^2 + S_n/n$," and insert -- $\sigma_n^2 = S_n/n$, -- therefor.

In column 16, line 1, in claim 19, delete "stage" and insert -- storage --, therefor.

In column 16, line 33, in claim 20, delete "(1-w) ." and insert -- (1-w). --, therefor.

Signed and Sealed this
Eighteenth Day of October, 2011

David J. Kappos
*Director of the United States Patent and Trademark Office*